United States Patent

Wicklund

[11] Patent Number: 5,963,553
[45] Date of Patent: Oct. 5, 1999

[54] HANDLING ATM MULTICAST CELLS

[75] Inventor: Göran Wicklund, Nacka, Sweden

[73] Assignee: Telefonaktiebolaget LM Ericsson, Stockholm, Sweden

[21] Appl. No.: 08/890,758

[22] Filed: Jul. 11, 1997

[51] Int. Cl.[6] .................................................. H04L 12/28
[52] U.S. Cl. ...................... 370/390; 370/412; 370/413
[58] Field of Search .................................. 370/395, 412, 370/413, 414, 415, 416, 417, 418, 390

[56] References Cited

U.S. PATENT DOCUMENTS

| | | |
|---|---|---|
| 5,339,318 | 8/1994 | Tamaka et al. . |
| 5,367,520 | 11/1994 | Cordell . |
| 5,414,701 | 5/1995 | Shtayer et al. . |
| 5,418,786 | 5/1995 | Loyer et al. . |
| 5,420,858 | 5/1995 | Marshall et al. . |
| 5,440,552 | 8/1995 | Sugita . |
| 5,455,825 | 10/1995 | Lauer et al. .............................. 370/60 |
| 5,467,349 | 11/1995 | Huey et al. . |
| 5,481,687 | 1/1996 | Goubert et al. . |
| 5,483,526 | 1/1996 | Ben-Num et al. . |
| 5,504,743 | 4/1996 | Drefenstedt . |
| 5,506,847 | 4/1996 | Shobatake ............................ 370/94.3 |
| 5,515,359 | 5/1996 | Zheng . |
| 5,521,917 | 5/1996 | Watanabe et al. . |
| 5,530,698 | 6/1996 | Kozaki et al. . |
| 5,530,806 | 6/1996 | Condon et al. . |
| 5,546,377 | 8/1996 | Ozveren . |
| 5,550,823 | 8/1996 | Irie ......................................... 370/413 |
| 5,555,256 | 9/1996 | Calamvokis . |
| 5,572,522 | 11/1996 | Calamvokis et al. . |
| 5,689,505 | 11/1997 | Chiussi et al. .......................... 370/388 |

FOREIGN PATENT DOCUMENTS

| | | |
|---|---|---|
| 0 676 878 A1 | 10/1995 | European Pat. Off. . |
| 0 680 179 A1 | 11/1995 | European Pat. Off. . |
| 0 710 047 A2 | 5/1996 | European Pat. Off. . |
| 2 301 913 | 12/1996 | United Kingdom . |

OTHER PUBLICATIONS

IBM Technical Disclosure Bulletin, vol. 35, No. 3, "Connectionless ATM Network Support Using Virtual Path Connections," pp. 445–448, Aug. 1992.

IBM Technical Disclosure Bulletin, vol. 36, No. 1, "Combined Translation Lookaside Buffer for Page Frame Table and Translation Control Word Entries," pp. 240–242, Jan. 1993.

IBM Technical Disclosure Bulletin, vol. 38, No. 11, "Fast Technological Update in Asynchronous Transfer Mode Networks," pp. 359–360, Nov. 1995.

IBM Technical Disclosure Bulletin, vol. 39, No. 1, "Method for High–Speed Swapping of Asynchronous Transfer Mode Virtual Path Identifier/Virtual Channel Identifier Headers," pp. 225–228, Jan. 1996.

*Primary Examiner*—Huy D. Vu
*Assistant Examiner*—Alexander Boakye
*Attorney, Agent, or Firm*—Nixon & Vanderhye, P.C.

[57] ABSTRACT

An Asynchronous Transfer Mode (ATM) switching device handles active and passive leaves. For a multicast connection being routed through the switching device, there is set up both a passive leaves queue (PLQ) for each physical output link and a leaf table for each leaf of the multicast connection. The leaf tables are added and removed for each connection on the fly as each leaf is added or removed. For a passive leaf of the multicast connection, the leaf table for the passive leaf is linked to an appropriate one of the passive leaves queues. However, upon reception of a cell from a switch core, the appropriate one of the passive leaves queues is activated by being linked to an activation queue (AQ). Thereafter a pointer is set, in an active leaves queue (ALQ), to the leaf table indicated in the appropriate passive leaves queue (PLQ). There is an active leaves queue for each physical output.

50 Claims, 21 Drawing Sheets

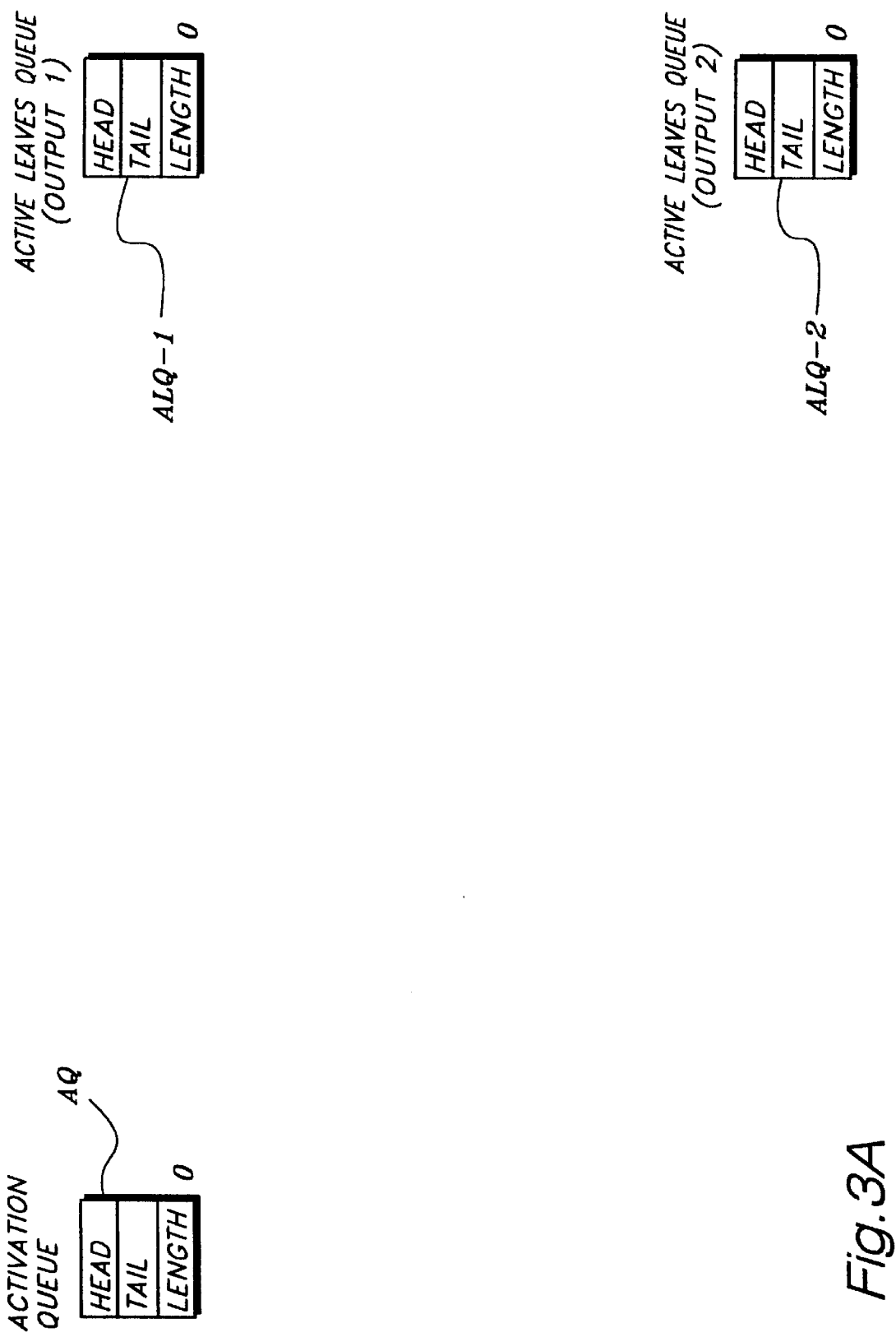

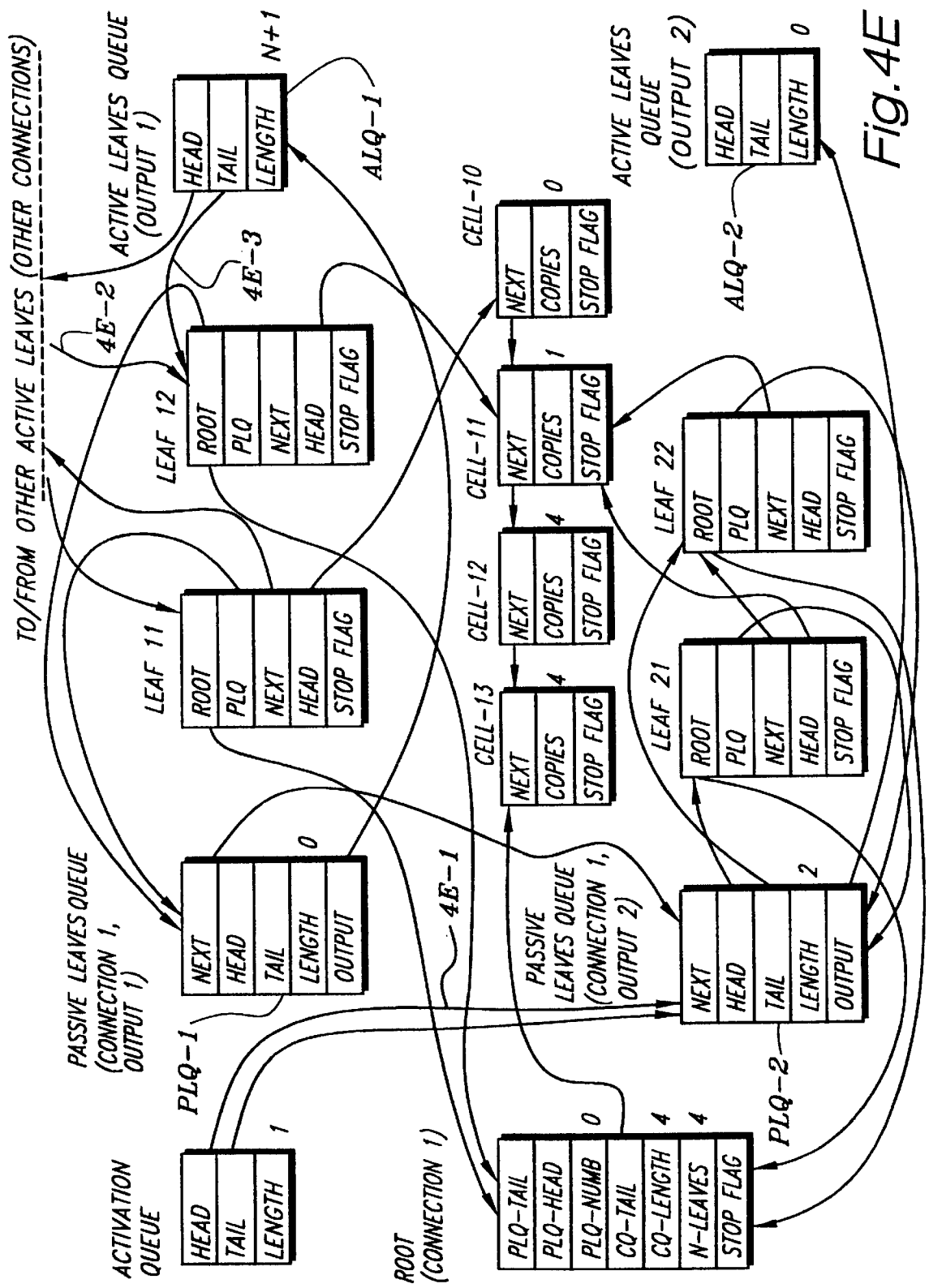

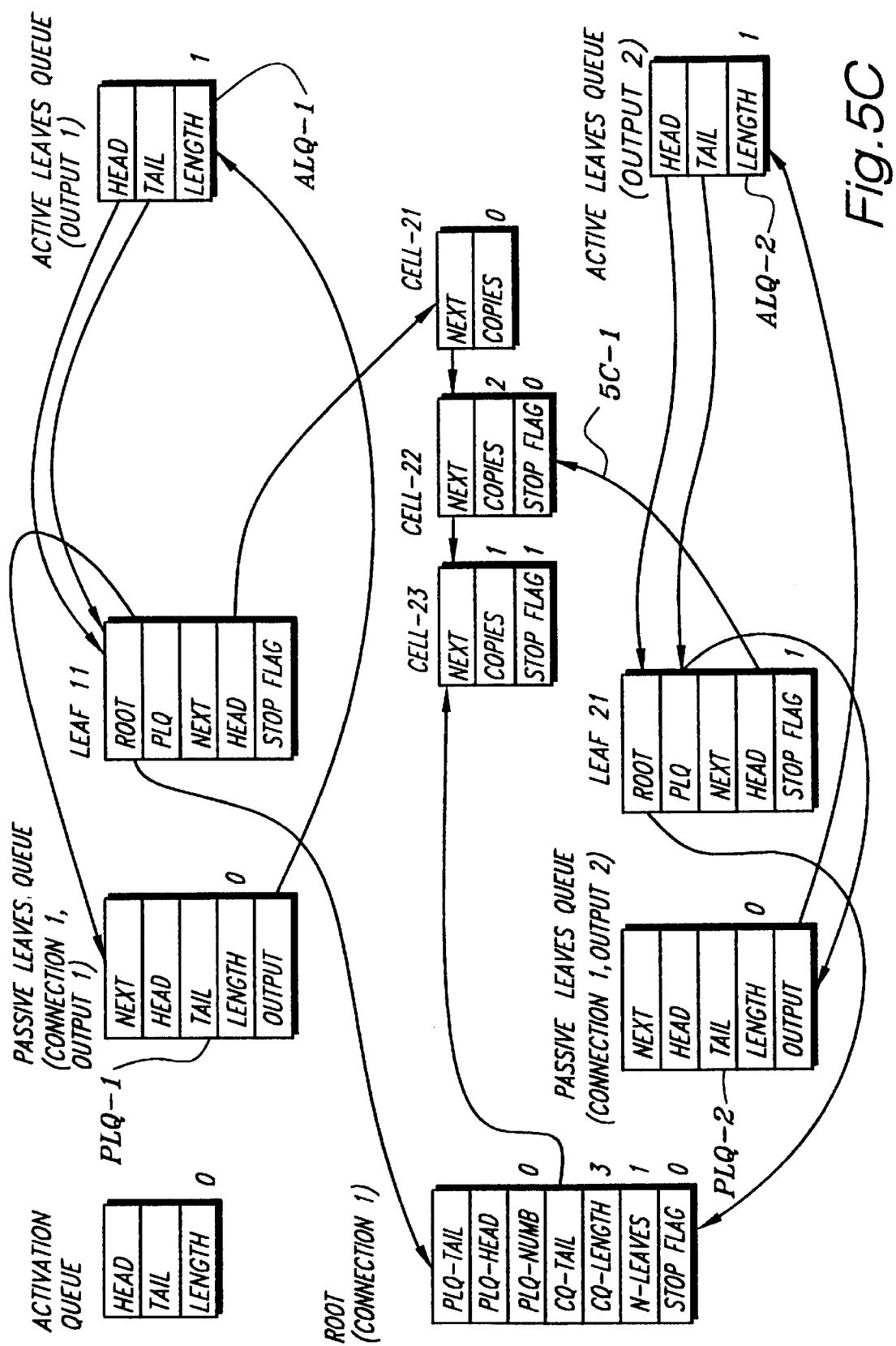

HANDLING ATM MULTICAST CELLS

This application is related to the following (all of which are incorporated herein by reference): U.S. patent application Ser. No. 08/893,391, entitled "VC MERGING FOR ATM SWITCH", filed Jul. 11, 1997; U.S. patent application Ser. No. 08/891,232, entitled "ABR SERVER", filed Jul. 11, 1997; U.S. patent application Ser. No. 08/893,576, entitled "A DATA SHAPER FOR ATM TRAFFIC", filed Jul. 11, 1997; U.S. patent application Ser. No. 08/893/079, entitled "VP/VC LOOK-UP FUNCTION", filed Jul. 11, 1997.

BACKGROUND

1. Field of Invention

This invention pertains to telecommunications, and particularly to the handling of cells in a switching node of a telecommunications network operating in the asynchronous transfer mode.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

At its termination points, an ATM network is connected to terminal equipment, e.g., ATM network users. Between ATM network termination points are a plurality of switching nodes having ports which are connected together by physical transmission paths or links. In traveling from an origin terminal equipment to a destination terminal equipment, ATM cells forming a message may travel through several switching nodes.

A switching node has a plurality of ports, each of which is connected by a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for a plurality of connections, a connection being a transmission between a calling subscriber or party and a called subscriber or party.

Many cells which are transmitted through an ATM network travel from an origination node to a single destination or target node, and accordingly are known as point-to-point cells. Some switching nodes are capable of handling cells, known as point-to-multipoint cells or multicast cells, which travel from an origination node to a plurality of destination nodes. Some of the point-to-multipoint cells, although being for differing connections, may travel on the same link.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from an ingress side of the switch to an egress side of the switch, and ultimately from the originating terminal equipment to the destination terminal equipment.

In a conventional switching technique, queues or buffers are provided for each port for e.g., storing cells prior to readout. In situations in which cells may have one of a plurality of priority classes, each port may have a number of queues or buffers corresponding to the number of priority classes. Cells are fed into an appropriate buffer by an input queue selector, and are readout of the buffer at an appropriate time by an output queue selector.

The handling of point-to-multipoint cells, e.g., multicast cells, on an egress side of the switch, has received attention. See, for example, U.S. patent application Ser. No. 08/893,677 filed Jul. 11, 1997, entitled "BUFFERING OF POINT-TO-POINT AND/OR POINT-TO-MULTIPOINT ATM CELLS", which is incorporated herein by reference. Multicast encompasses the notions of both physical multicast and logical multicast. By "physical multicast" is meant that a cell is copied to different physical outputs. By "logical multicast" is meant that a cell is copied one or more times to the same physical output, each copy having its own VPI/VCI value. Physical and logical multicast may be combined in the same port.

In multicast terminology, a "leaf" is a connection to which a cell should be copied, and a "logical leaves" are connections in the same link (e.g., physical output) to which the cell should be copied. Concerning the egress side of a switch, if one leaf has read all the cells currently residing in an egress-side cell buffer that the leaf is supposed to read, that leaf is said to be "passive". On the other hand, when the cell buffer currently contains more cells that the leaf is supposed to read, the leaf is said to be "active".

Various multicast techniques are described in U.S. Pat. No. 5,572,522 to Calamvokis et al., entitled "ASYNCHRONOUS TRANSFER MODE SWITCH WITH MULTICASTING ABILITY", also incorporated herein by reference. In one of those techniques, each arrival of a new cell from the switch core causes a multicast expander to queue associated output VCNs that are not already in a scheduling loop. However, neither addition nor removal of output VCNs are contemplated, as it is assumed that all output VCNs are set up at the same time and remain for the entire duration of a connection. Another multicast technique is described in U.S. Pat. No. 5,528,588 to Bennett et al.

What is needed, therefore, and an object of the present invention, is method and apparatus for efficiently handling active and passive leaves and connections, and for adding and removing leaves during an existing connection.

SUMMARY

An Asynchronous Transfer Mode (ATM) switching device handles active and passive leaves. For a multicast connection being routed through the switching device, there is set up both a passive leaves queue for each physical output link and a leaf table for each leaf of the multicast connection. The leaf tables are added and removed for each connection on the fly as each leaf is added or removed. For a passive leaf of the multicast connection, the leaf table for the passive leaf is linked to an appropriate one of the passive leaves queues.

However, upon reception of a cell from a switch core, the appropriate one of the passive leaves queues is activated by being linked to an activation queue. Thereafter a pointer is set, in an active leaves queue to the leaf table indicated in the appropriate passive leaves queue. There is an active leaves queue for each physical output.

The ATM switch also comprises a cell buffer (in which several cell queues are implemented as linked lists) and a root table. The cell buffer is utilized to determine what cells, obtained from a switch core, are to be read out of the switching device. The root table has stored therein, e.g., a number of entries in the cell queue; an address of the last cell in the cell buffer; and a number of leaves for the next cell to be stored in the cell buffer.

For an active leaf, the pointer to the leaf table is kept in an appropriate one of the active leaves queues until there are no more cells in the cell buffer to be read out for the active leaf. Whether there are no more cells in the cell buffer to be read out for the active leaf is determined by comparing a head pointer stored in the leaf table to a cell buffer tail pointer stored in the root table, the head pointer stored in the leaf table pointing to the next cell in the cell buffer for the active link and cell buffer tail pointer pointing to the last cell in the cell buffer.

The passive leaves queues are linked together. In this regard, the first passive leaves queue has stored therein a next pointer to a next passive leaves queue for linking the next passive leaves queue to the first passive leaves queue.

When a specified leaf is to be removed from a connection, Stop Flags are set both in the leaf and in the root table. Thereafter, when a new cell enters from the switch core, a Stop Flag for the new cell is also set and the Stop Flag in the root table is cleared. When the leaf-to-be-removed attempts to read the new cell having its Stop Flag set, the new cell is not read. Rather, the leaf is removed and the Stop Flag for the new cell is set to zero. In this manner a leaf is removed on the fly.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A–FIG. 3F are diagrammatic views illustrating events performed in the setup of a connection, as well as cell reception and transmission in accordance with a mode of the present invention.

FIG. 4A–FIG. 4F are diagrammatic views illustrating events performed in adding new leaves to an existing connection.

FIG. 5A–FIG. 5D are diagrammatic views illustrating events performed in removing, e.g., tearing down, a leaf from an existing connection.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

1.0 SWITCH STRUCTURE

Figure 1:
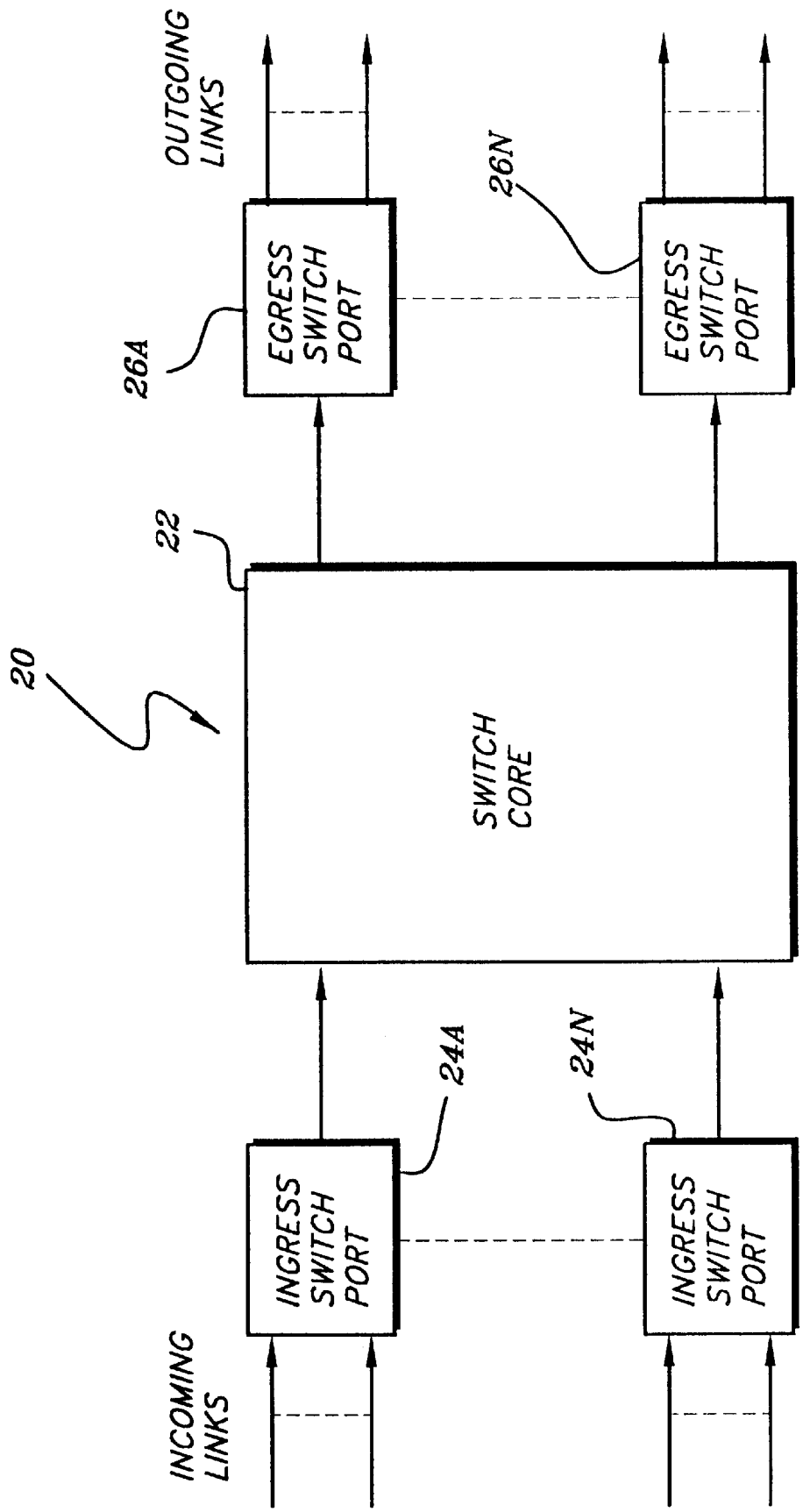
FIG. 1 is a schematic view of an embodiment of an ATM switch in which the present invention is employed, including data structures utilized by the ATM switch.

FIG. 1 shows generally an ATM switch 20 which includes a switch core 22 which is connected to a plurality of ingress switch ports 24A–24N and a plurality of egress switch ports 26A–26N. Each ingress switch port 24 is connected to a plurality of incoming physical links, each egress switch port 26 is connected to a plurality of outgoing physical links.

ATM cells enter the ingress ports 24 via the incoming physical links, and are switched through the switch core 22 to one, or several, egress switch ports 26. It should be understood that there are many ways of implementing the ingress switch port and the switch core, and that details and configurations thereof are not germane to the present invention. Rather, the present invention concerns the egress switch ports 26. The only requirement for the ingress switch ports 24 is that it adds a connection number to each cell. The connection number is used by the egress switch port to identify the connection to which a certain cell belongs.

1.1 EGRESS PORT ARCHITECTURE

Figure 1A:
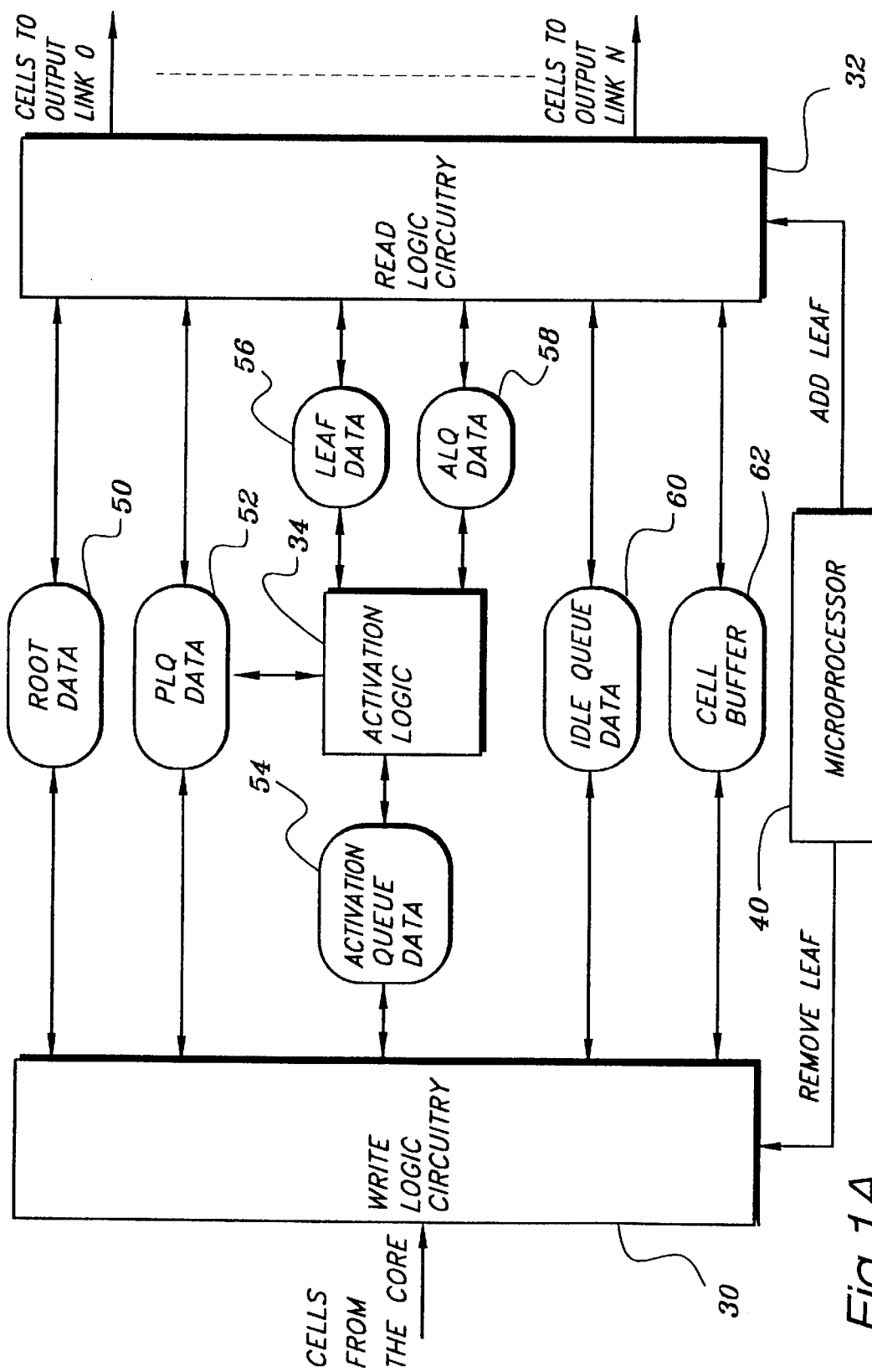
FIG. 1A is a schematic view of an egress port of the ATM switch of FIG. 1.

FIG. 1A shows in more detail a representative one of the egress switch ports 26. As seen in FIG. 1A, an egress switch port 26 comprises write logic circuitry 30 which receives cells from switch core 22 and read logic circuitry 32 from which cells are outputted to the outgoing links. Activation logic circuitry 34 is shown positioned in egress switch port 26 between write logic circuitry 30 and read logic circuitry 32. Collectively, the write logic circuitry 30, read logic circuitry 32, and activation logic circuitry 34 comprises what is generally referred to as a logic circuit.

Microprocessor 40 is connected to write logic circuitry 30 for controlling a remove leaf operation, and to read logic circuitry 32 for controlling an add leaf operation. Both remove leaf and add leaf operations are described subsequently.

Egress switch port 26 also includes a plurality of memory locations for storing data pertinent to the present invention. As shown in FIG. 1A, such data includes Root data (represented as location 50 in FIG. 1A); PLQ (Passive Leaf Queue) 52; Activation Queue data 54; Leaf Data 56; ALQ data (Active Leaf Queue) 58; Idle Queue data (IQ) 60; and the cell queue. The cell queue is a common memory area in which several cell queues are implemented as linked lists. While FIG. 1A shows a plurality of memories for the differing data structures, it should be understood that one or more of the data structures can be stored in a common memory (e.g., RAM).

Microprocessor 40 is responsible for adding and removing leaves. Microprocessor 40 gets its orders from an unillustrated central processor connected to ATM switch core 22. The central processor and each processor that controls an egress port communicates via ATM cells, e.g., using AAL-5 (Adaptation Layer 5) protocol.

1.2 ACTIVE AND PASSIVE LEAVES

In accordance with the present invention, each leaf reads cells from the same list (a cell queue). For each leaf there is a pointer (Head) which keeps track of where in the cell queue the leaf shall next read. When a cell is read from the cell queue, the pointer (Head) is moved one cell forward. Two leaves may read the cells in the cell queue at (momentarily) different rates, due e.g., to different traffic situations at the different physical outputs. If one leaf has read all the cells currently residing in the cell queue that the leaf is supposed to read, that leaf is said to be "passive". On the other hand, when the cell queue currently contains more cells that the leaf is supposed to read, the leaf is said to be "active".

The difference between an active and a passive leaf is that when a new cell enters from the switch core and is stored in the cell queue, the active leaf just proceeds as previously. It is reading from a position earlier up in the cell queue and is not affected by the increase in length of the cell queue. However, when a new cell enters from the switch core, the passive leaf must be activated, i.e., must start to read from the queue again.

1.3 DATA STRUCTURES

As shown in FIG. 1A, the following types of data structures are provided: the cell queue (also known as VC QUEUE), ROOT 50, LEAF 56, PASSIVE LEAVES QUEUE (PLQ) 52, ACTIVES LEAVES QUEUE (ALQ) 58, ACTIVATION QUEUE (AQ) 54, and IDLE QUEUE 60. Brief comments concerning each data structure type are provided in the ensuing paragraphs.

1.3.1 CELL BUFFER

The cell queue is the data structure into which cells having the same VC are entered upon reception from the switch core. Upon start up, all memory locations in a common cell buffer pool are linked to an idle list. When a cell enters from the switch core, the cell is stored in the first location specified in the idle list. This memory location is then linked out from the idle list and linked to the correct cell queue. When the last leaf has read a cell, the memory location is returned to the idle list.

In addition to the cell itself, there are stored in the cell queue the following fields associated with each cell: Next, Copies, and Stop Flag. The Next field contains a pointer to the next cell in the cell queue. The Copies field contains the number of leaves that still have to read this cell. The Stop Flag is a one bit flag having a function subsequently described herein.

1.3.2 ROOT DATA STRUCTURE

The ROOT data structure has one entry or table for each multicast connection. Each entry or table includes the following fields: PLQ-tail; PLQ-head; PLQ-numb; CQ-tail; CQ-length; N-leaves; and, Stop Flag. A number of passive leaves queues are typically linked together to form a queue of passive leaves queues associated with the root. PLQ-tail is a pointer to the last PLQ (PASSIVE LEAVES QUEUE) that is linked to this root. PLQ-head is a pointer to the first PLQ (PASSIVE LEAVES QUEUE) that is linked to this root. PLQ-numb is the number of PLQs linked to this root. CQ-tail is a pointer to the last cell in the cell queue (CQ) for this connection. CQ-length is the length of the cell queue (CQ). N-leaves is the number of leaves for this connection. The Stop Flag is a one bit flag having a function subsequently described herein.

1.3.3 LEAF DATA STRUCTURE

The LEAF data structure has one leaf entry or table for each leaf of this connection. Each entry or table of the LEAF data structure has the following fields: ROOT, PLQ, Next, Head, Stop Flag, VP/VC, New-VPI, New-VCI. For sake of simplicity, the last three of these fields are not illustrated in the accompanying figures.

In the LEAF data structure, the ROOT field contains a pointer to the root entry or table for this connection. The PLQ field contains a pointer to the PLQ to which this leaf will be linked when it is passive. The Next field contains a pointer to the next leaf in the same PLQ (PASSIVE LEAVES QUEUE) or ALQ (ACTIVE LEAVES QUEUE). The Head field contains a pointer to the cell queue (CQ) from which this leaf shall read cells. The Stop Flag is a one bit flag having a function subsequently described herein.

Regarding the unillustrated fields in the LEAF data structure, the PV/VC is a one bit indicator which (1) when having the value of "1" indicates that both the VPI and VCI fields will be replaced with new values, and (2) when having the value "0" indicates that only the VPI value will be changed. The New-VPI field contains the new VPI that cells for this leaf will get when they are transmitted. The New-VCI field contains the new VCI that cells for this leaf will get when they are transmitted.

When a leaf is added to an existing connection, its cell pointer (Head field) is set to point to the currently last cell in the cell queue. The leaf itself is put into a list of passive leaves for a connection and output, e.g., one of the queues in the PASSIVE LEAVES QUEUE data structure. In addition, if this PLQ previously was empty, it is linked into a queue of PLQs for a root. When a leaf is removed, it is put in a pending state, meaning that all cells up to the currently last in the cell queue are read. The leaf is then not put back into any queue. The Stop Flag of this leaf is set to "1".

1.3.4 PASSIVE LEAVES QUEUE (PLQ) DATA STRUCTURE

There is one PASSIVE LEAVES QUEUE (PLQ) for each combination of connection and output. Each PLQ is a list of passive leaves for a connection and output. Each PLQ has the following fields: Next, Head, Tail, Length, and Output. The Next field contains a pointer to the next PLQ that is linked in the same queue of PLQs for a root, or in the ACTIVATION QUEUE. The Head field is a pointer to the first leaf in the PLQ. The Tail field is a pointer to the last field in the PLQ. The Length field contains the length of the PLQ. The Output field contains a pointer to the ALQ (ACTIVE LEAVES QUEUE) for the output to which this leaf shall send cells.

1.3.5 ACTIVE LEAVES QUEUE (ALQ) DATA STRUCTURE

There is one ACTIVE LEAVES QUEUE (ALQ) for each physical output. Each ALQ has the following fields: Head, Tail, and Length. The Head field contains a pointer to the first leaf in this ALQ. The Tail field contains a pointer to the last leaf in this ALQ. The Length field contains the length of the ALQ.

1.3.6 ACTIVATION QUEUE (AQ) DATA STRUCTURE

There is one ACTIVATION QUEUE (AQ) for the whole port (i.e., several physical outputs). The AQ has the following fields: Head, Tail, and Length. The Head field contains a pointer to the first PLQ in the AQ. The Tail field contains a pointer to the last PLQ in the AQ. The Length field contains the length of the AQ.

1.3.7 IDLE QUEUE (IQ) DATA STRUCTURE

The IDLE QUEUE (IQ) is a queue in which all unused cell-positions are linked. Although not specifically illustrated in all figures hereof, the IDLE QUEUE includes a Head field, a Tail field, and a Length field.

1.4 LOGICAL UNITS

The logical units of egress switch port 26, particularly write logic circuitry 30, read logic circuitry 32, and activation logic circuitry 34, interact with the various data structures shown in FIG. 1A. Thus, two or three of these logical units can read and write in the same data structure. The person skilled in the art will understand that such interaction can be accomplished in various ways, such as by use of dual port memories (e.g., memories with two independent address and data buses), for example, or by using a multiplexor between the logical units and the memories. Alternatively, write logic circuitry 30, read logic circuitry 32, and activation logic circuitry 34, which are collectively known as the logic circuit, can be implemented by one or more microprocessors.

The write logic circuitry 30, read logic circuitry 32, and activation logic circuitry 34, are essentially state machines which accomplish the respective functions described herein. The person skilled in the art will know of several ways to construct such circuitry given the functions described herein.

1.4.1 WRITE LOGIC CIRCUITRY

Write logic circuitry 30 performs a number of functions, including the following: collecting an empty cell buffer position from the Idle Queue 60; storing an incoming cell in the cell queue and linking the cell to the correct Cell Queue (given by the connection number); updating data in the root entry 50 for the connection; moving the existing passive leaf queues (PLQs) for that connection to the Activation Queue; and receiving add and remove orders from microprocessor 40 and changing the data structures accordingly.

1.4.2. READ LOGIC CIRCUITRY

Read logic circuitry 32 performs functions including the following: selecting each active leaf queue (ALQ) and, in turn, reading out the first leaf in an ALQ, reading out the next cell for that leaf, updating the cell header information with new VPI and possibly new VCI values and sending the cell out to the right outgoing link. In addition, the read logic circuitry 32 decrements the copy value in the cell and, if it reaches zero, the last cell buffer in the cell queue is linked into the Idle Queue.

Further, the read logic circuitry 32 checks whether the leaf has reached its stop position in the cell queue. If it has, the leaf is removed (i.e., not linked into any queue structure).

The read logic circuitry 32 also checks whether a leaf has read all currently stored cells in the cell queue. If not, the leaf is put back into the active leaf queue (ALQ). If it has, the leaf is put into the correct passive leaf queue (PLQ). If the PLQ was empty, it is put into the queue of PLQs in the root entry.

In addition, the read logic circuitry 32 receives add and remove orders from microprocessor 40 and changes the data structures accordingly.

2.0 LEAF HANDLING

Figure 2A:
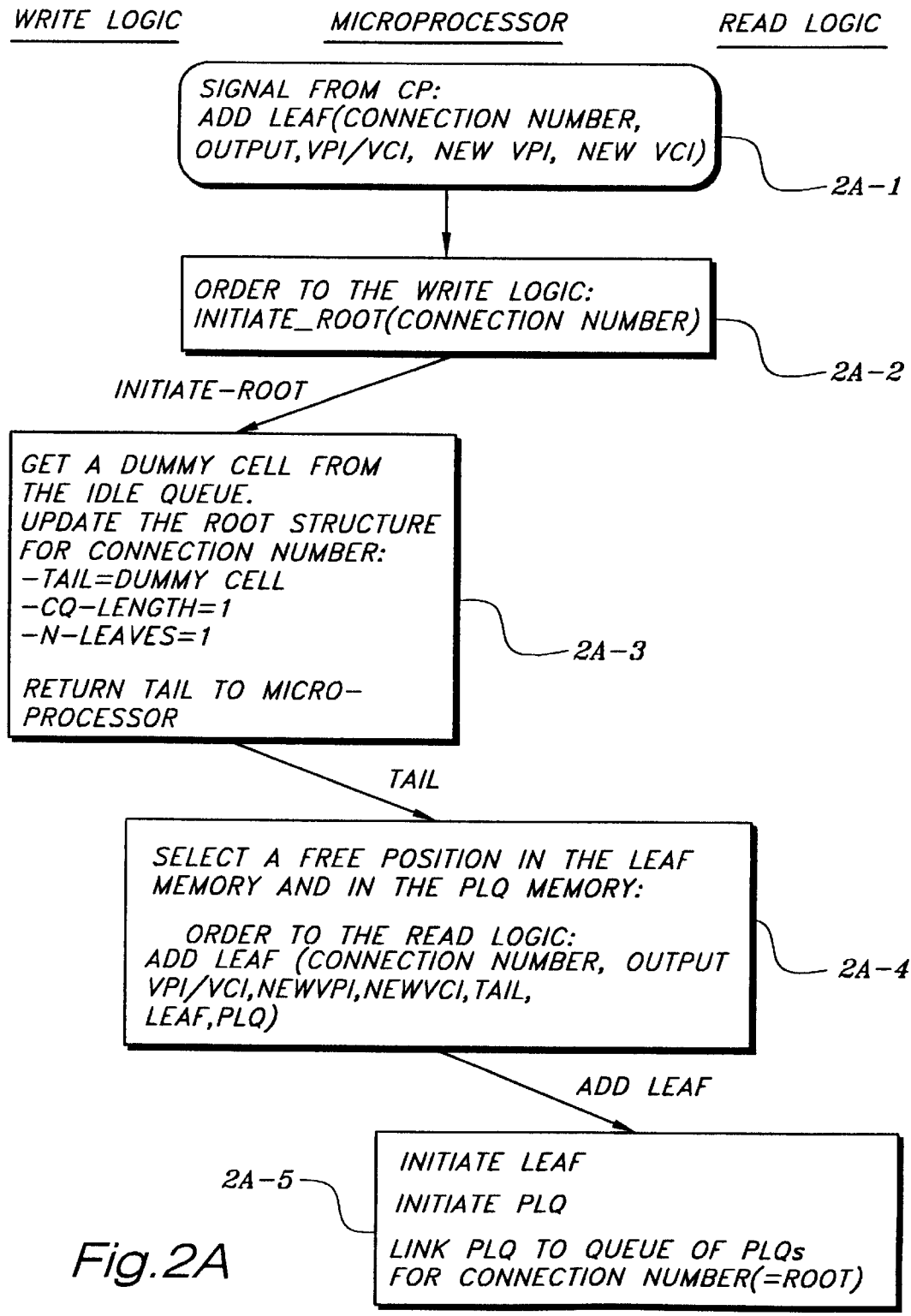
FIG. 2A is a flowchart showing steps involved when adding a first leaf.
Figure 2B:
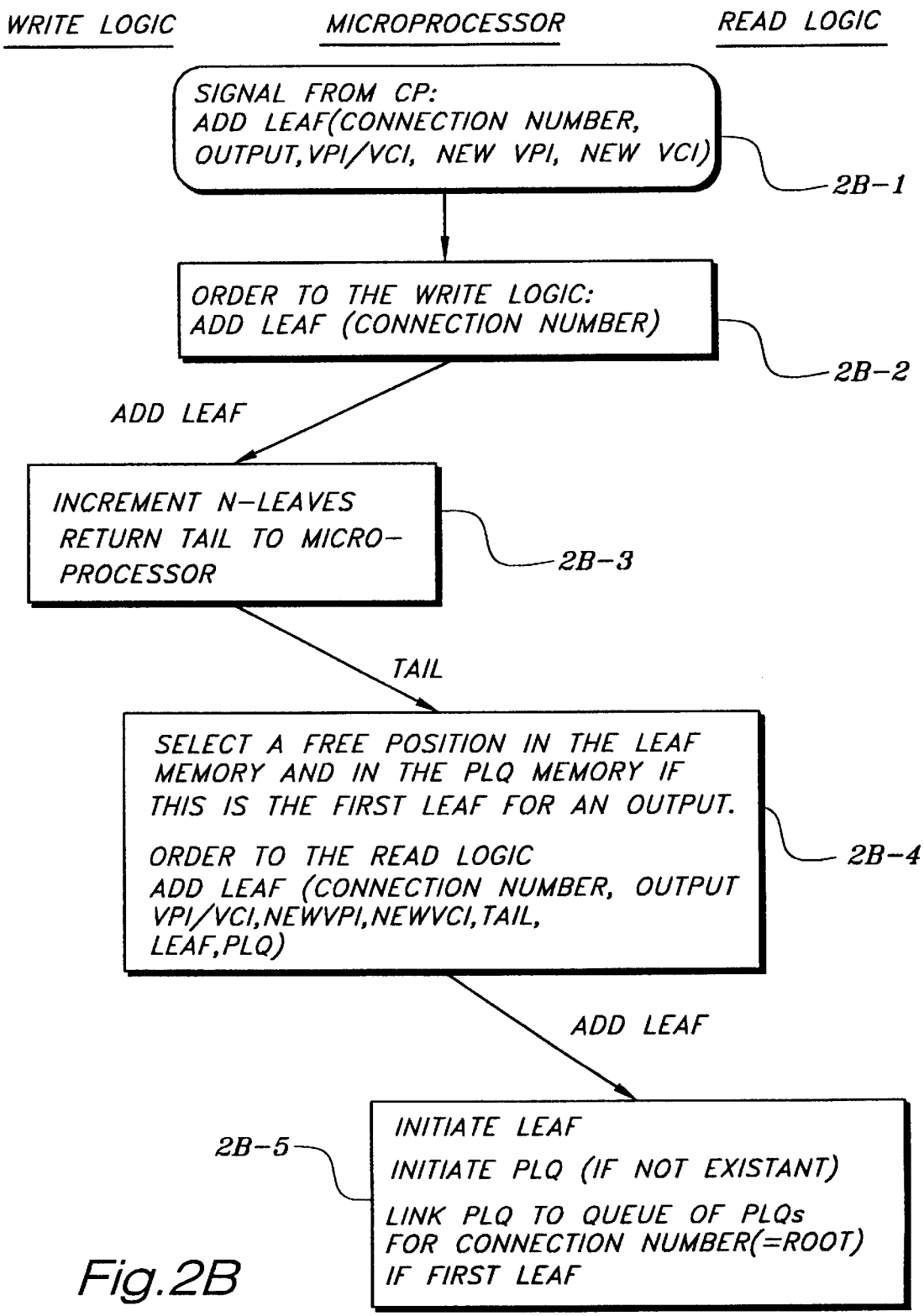
FIG. 2B is a flowchart showing steps involved when adding an additional leaf.

FIG. 2A shows steps involved when adding a first leaf, which also involves initiating a root. FIG. 2B shows how each additional leaf is added.

2.1 ADDING FIRST LEAF

As shown by step 2A-1 in FIG. 2A, when a first leaf is to be added, an "AddLeaf" signal is sent from central processor to microprocessor 40. The "AddLeaf" signal has the following parameters: Connection Number, Output, VPI/VCI, New VPI, New VCI. The Connection Number parameter is an identifier of the connection, and acts as a direct address into the root table. The Output parameter is a designation of the link to which this leaf shall be connected. The VPI/VCI parameter is a bit indicating whether this connection is a virtual path or a virtual channel. The New VPI parameter is the new VPI value to be inserted into the cell header. The New VCI is the new VCI value to be inserted in the cell header (for a virtual channel only).

At step 2A-2 microprocessor 40 orders write logic circuitry 30 to initiate a root. The "Initiate_root" command sent to the write logic circuitry 30 passes the Connection Number parameter. The command is executed by writing the Connection Number into a designated "order" register of the write logic circuitry 30. This order register is read every cell time by the write logic circuitry 30. A "cell time" is a fixed period of time in which one cell is received from the switch core and one cell is sent to an output. If a new order is found in the order register, the write logic circuitry 30 takes the appropriate actions in accordance with the particular order.

As indicated by step 2A-3, in response to the initiate_root command a number of actions are taken by the write logic circuitry 30. The write logic circuitry 30 obtains a dummy cell position from the IDLE QUEUE (IQ) and makes the Tail of the root table point to this. The write logic circuitry 30 also updates the following fields in the root table: CQ-length and N-leaves. Finally, the write logic circuitry 30 writes the value of the Tail (i.e., the position of the dummy cell) in a register that can be read by microprocessor 40.

FIG. 2A shows step 2A-3 returning the value of Tail to microprocessor 40, whereupon microprocessor 40 executes step 2A-4. In step 2A-4, microprocessor 40 selects free positions in the LEAF DATA STRUCTURE and PLQ (PASSIVE LEAVES QUEUE) memories. In this regard, microprocessor 40 has a list of free positions. Microprocessor 40 then, by sending an Addleaf command, orders the read logic circuitry 32 to add a leaf, passing to the read logic circuitry 32 the following parameters: Connection Number, Output, VPI/VCI, New VPI, New VCI, Tail, Leaf, and PLQ. The first five of these parameters have been defined previously; the Tail parameter is the dummy cell position; the PLQ parameter is a pointer to the PASSIVE LEAVES QUEUE (PLQ). The leaf parameter is a pointer to the free leaf position selected by microprocessor 40.

As shown by step 2A-5, upon receipt of the Addleaf command from microprocessor 40, the read logic circuitry 32 initiates the data structures (LEAF DATA STRUCTURE and PASSIVE LEAVES QUEUE) using the command parameters (e.g., connection number), and then adds the PLQ to the queue of PLQs for the root by linking the PLQ to the queue of PLQs.

2.2 ADDING ADDITIONAL LEAVES

FIG. 2B shows steps involved in the addition of new leaves, e.g., when a root exists and a new leaf is added. In such case, as indicated by step 2B-1 the signal from the central processor to microprocessor 40 is the same as for step 2A-1. However, as shown by step 2B-2, the command to the write logic circuitry 30 is an AddLeaf command which has the Connection Number (equal to the root) as a parameter.

At step 2B-3, the write logic circuitry 30 increments the field N-leaves in the root table and returns the value of the Tail pointer to the microprocessor 40. Upon receipt of the Tail pointer value, as shown by step 2B-4 the microprocessor 40 selects a free position in the LEAF DATA STRUCTURE, and in case this leaf is the first for an output, also a free position in the PASSIVE LEAVES QUEUE DATA STRUCTURE. If the PLQ already exists, the pointer to it is retrieved from the internal data structure in the microprocessor 40 (using the Connection Number and Output as indices for a table lookup). Then, as indicated by step 2B-5, the read logic circuitry 32 is sent an Addleaf command by which it initiates the leaf and the PLQ (if the PLQ does not exist). The read logic circuitry 32 also links the PLQ to the queue of PLQs for the root if the PLQ was empty.

2.2 REMOVING A LEAF

Figure 2C:
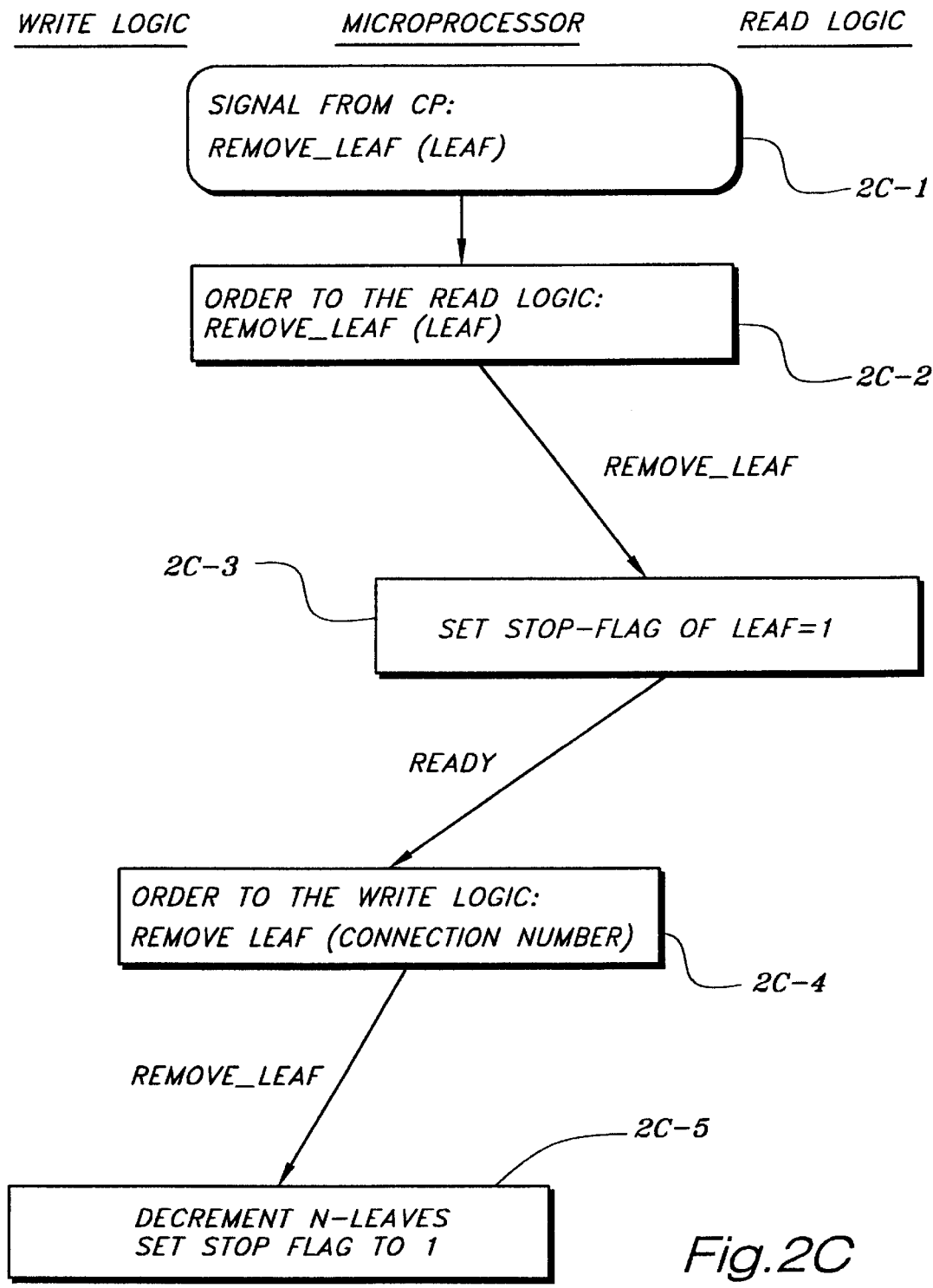
FIG. 2C is a flowchart showing steps involved when removing a leaf.

FIG. 2C shows general steps involved in removal of a leaf. At step 2C-1, the microprocessor 40 receives a Remove_Leaf signal from the central processor, with a pointer to the leaf-to-be-removed as the only parameter of the signal. At step 2C-2, the microprocessor 40 uses a Remove_leaf command to order the read logic circuitry 32 to set the Stop Flag in the leaf entry to "1". Step 2C-3 shows the read logic circuitry 32 setting the Stop Flag to "1". Upon performance of step 2C-3, at step 2C-4 the microprocessor 40 orders the write logic circuitry 30 (using a RemoveLeaf command) to decrement the N-leaves field of the root table and set the value of the Stop Flag field in the root table to "1". The responsive actions of the write logic circuitry 30 are reflected by step 2C-5. When the next cell enters, the cell is marked by setting a special bit in the buffer position to "1", and the Stop Flag in the root table is set back to zero. When the stop-marked leaf reads a cell, it will first check if the cell is stop-marked. If so, the cell will not be read out, and the stop-marker in the cell will be set to zero. The leaf will not be put back into any queue.

3.0 EXAMPLE—CONNECTION SETUP, CELL RECEPTION AND TRANSMISSION

FIG. 3A–FIG. 3F illustrate events performed in the setup of a connection, as well as cell reception and transmission in accordance with a mode of the present invention. In the example scenario described in FIG. 3A–FIG. 3F, only two outputs are assumed, although it should be understood that a different number (e.g., greater) of outputs can be utilized in other scenarios.

FIG. 3A shows pertinent data structures before any connection is set up. Since a connection is not yet set up, only the ACTIVATION QUEUE (AQ) and two ACTIVE LEAVES QUEUES (ALQ), particularly ALQ-1 and ALQ-2, are shown. All Length fields are set to zero.

Figure 3B:
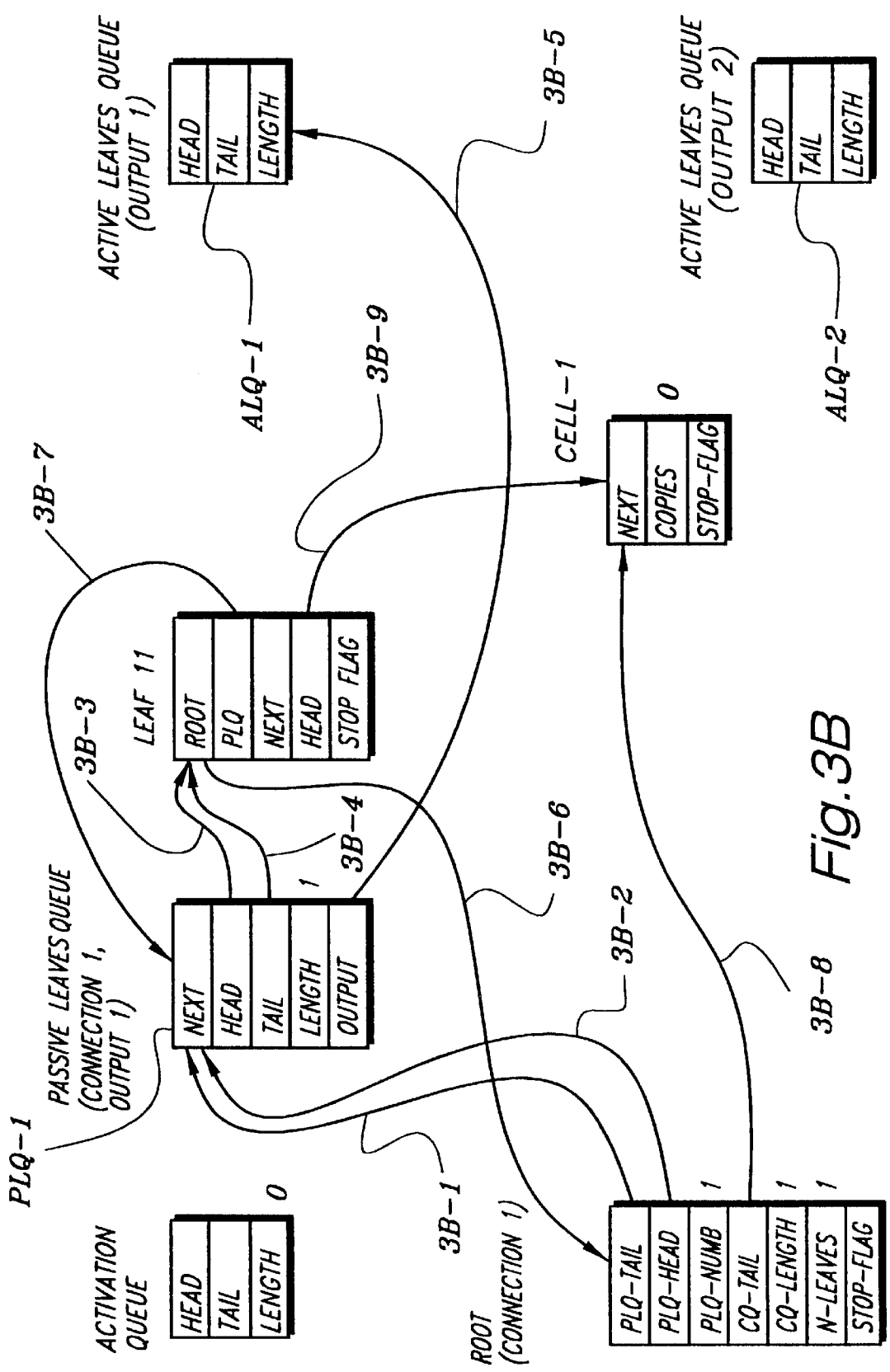

FIG. 3B shows set up of a new connection (Connection 1) with one leaf generally in accordance with step 2A-3 of FIG. 2A. As reflected by FIG. 3B, microprocessor 40 initiates a ROOT table for the connection, as well as LEAF 11 in the LEAF data structure and a PLQ-1 queue in the PASSIVE LEAVES QUEUE data structure. In this regard, the PLQ-head and PLQ-tail fields of the ROOT table are set to point to PLQ-1, as shown by arrows 3B-1 and 3B-2, respectively. The Head and Tail fields of PLQ-1 in the PASSIVE LEAVES QUEUE data structure are set to point to LEAF 11, as shown by arrows 3B-3 and 3B-4, respectively. The Output field of PLQ-1 is set to point to ALQ-1 in the ACTIVE LEAVES QUEUE data structure, as indicated by arrow 3B-5. In LEAF 11, the Root field is set to point to the ROOT table (as indicated by arrow 3B-6) and the PLQ field is set to point to PLQ-1(as shown by arrow 3B-7).

As also shown in FIG. 3B and in furtherance of step 2A-3 of FIG. 2A, a dummy cell position, shown as Cell-1, is fetched from the IDLE QUEUE (IQ) [unillustrated in FIG. 3B]. This dummy cell position is never read by the read logic circuitry 32. Pointers to Cell-1 are set up in the CQ-tail field of the ROOT and the Head field of LEAF 11, as indicated by arrows 3B-8 and 3B-9, respectively, in FIG. 3B. The PLQ-numb, CQ-length, and N-leaves in the ROOT table are all set to one (see step 2A-3 of FIG. 2A).

Figure 3C:
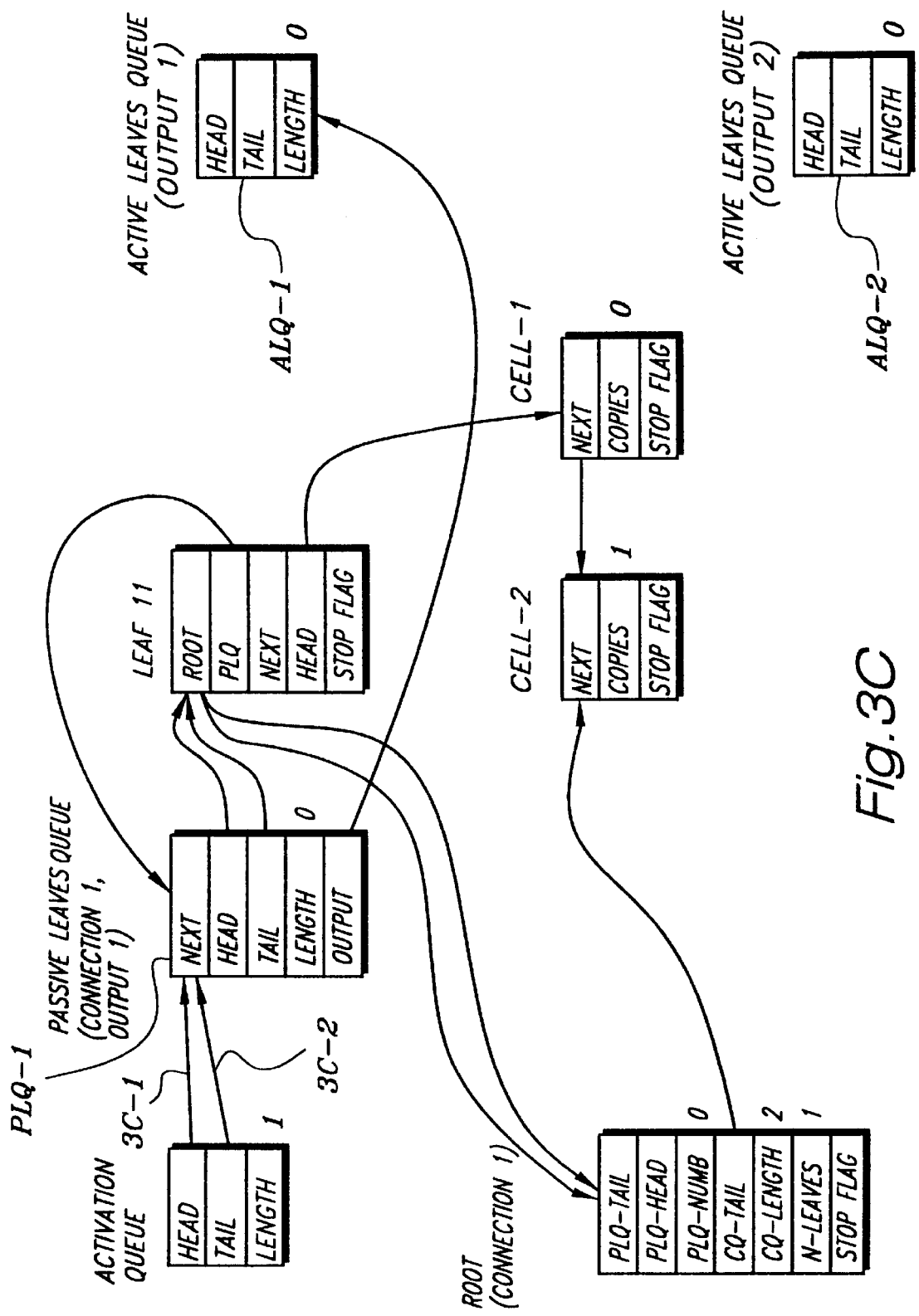

FIG. 3C shows actions taken by the write logic circuitry 30 upon entry of a cell (Cell-2) from the switch core, and linkage of the entering Cell-2 into the cell queue. The Copies field for Cell-2 is set to one, in accordance with the value of field N-leaves in the ROOT table. Field CQ-length in the ROOT table is incremented (from one to two). Entry of Cell-2 caused PLQ-1 in the PASSIVE LEAVES QUEUE data structure to be linked to ACTIVATION QUEUE (AQ). That is, the Head and Tail fields of the AQ are set to point to PLQ-1, as indicated by arrows 3C-1 and 3C-2, respectively. In this regard, the values to put into the Head and Tail fields of the AQ are obtained from the PLQ-head and PLQ-tail fields of the ROOT table. The field PLQ-numb in the ROOT table is cleared (e.g., set to zero).

Figure 3D:
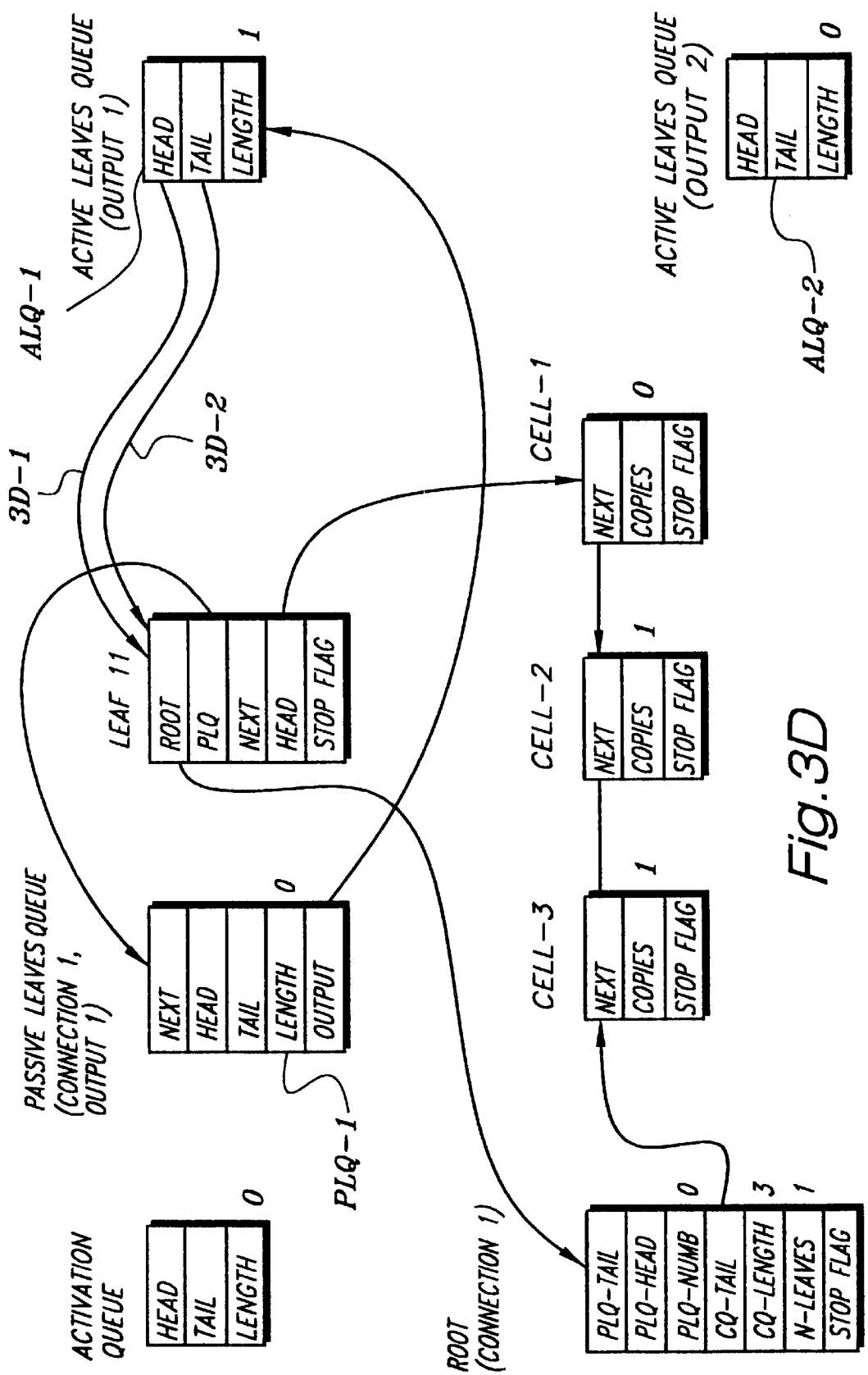

FIG. 3D shows another new cell, specifically Cell-3, entering from the switch core and being entered into the cell queue by the write logic circuitry 30. In view of the entry of Cell-3, the counter in field CQ-length of the ROOT table is incremented, now having the value 3.

As a background process performed by the activation logic circuitry 34, also reflected in FIG. 3D, queue PLQ-1 is linked to ALQ-1 in the ACTIVE LEAVES QUEUE data structure. This linking involves several steps. First, the address of PLQ-1 is obtained from the Head field of the ACTIVATION QUEUE (AQ) [see FIG. 3C]. Second, with the address of PLQ-1 known, the value in the Head field of PLQ-1 is consulted to obtain the pointer to LEAF 11 [see FIG. 3C]. Third, the pointer to LEAF 11 is stored in the Head and Tail fields of ALQ-1 in the ACTIVE LEAVES QUEUE data structure, as indicated by arrows 3D-1 and 3D-2, respectively, in FIG. 3D.

The acquisition of a pointer to leaf from the ACTIVATION QUEUE (AQ)) for storage in an appropriate queue in the ACTIVE LEAVES QUEUE data structure, as described in the preceding paragraph, is referred to as an "activation". One or more activations may occur every cell time. However, if the ACTIVATION QUEUE has many entries, a passive leaves queue may have to wait several cell times before it becomes activated. The present invention minimizes this time by allowing all leaves in one PLQ to be activated by one single relinkage of the chain of leaves from the PLQ to the ALQ.

Figure 3E:
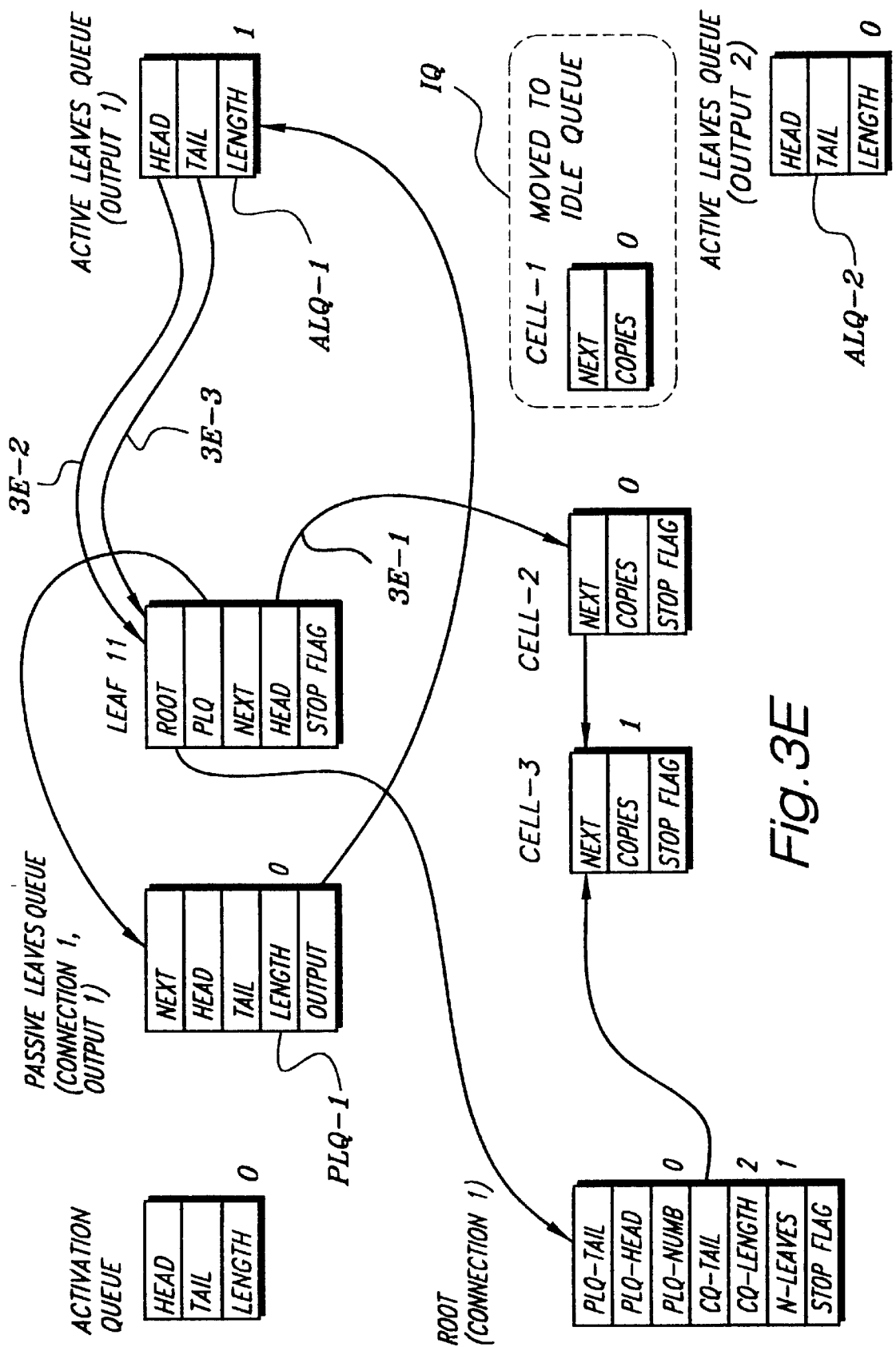

FIG. 3E shows Cell-1 being read by LEAF 11 as performed by the read logic circuitry 32. The cell-to-be-read is pointed to by the field Next in the cell that is in turn pointed to by field Head in LEAF 11. Accordingly, since (as shown in FIG. 3D) the field Next in LEAF 11 pointed to Cell-1 (which was a dummy cell), the value of the Next field in Cell-1 is consulted to determine which cell should next be read. Since, as shown in FIG. 3D, the Next field of (dummy) Cell-1 points to Cell-2, Cell-2 is read in FIG. 3E. Then, the Head field of LEAF 11 is changed to point to the next leaf in the cell queue, i.e., now Cell-2, as shown by arrow 3E-1. The counter in field Copies of Cell-2 is decremented, reaching zero as shown in FIG. 3E. Since the value of field Copies of Cell-2 reaches zero, Cell-1 is moved to the IDLE QUEUE (IQ) as shown in FIG. 3E. Also, the value of the counter in field CQ-length of the ROOT table is decremented (reaching two as shown in FIG. 3E). Although not shown in FIG. 3E, when reading out of Cell-2 by LEAF 11, LEAF 11 was momentarily taken out of queue ALQ-1. However, since LEAF 11 is still active, it is put back into queue ALQ-1, which is the condition shown in FIG. 3E as indicated by arrows 3E-2 and 3E-3.

Figure 3F:
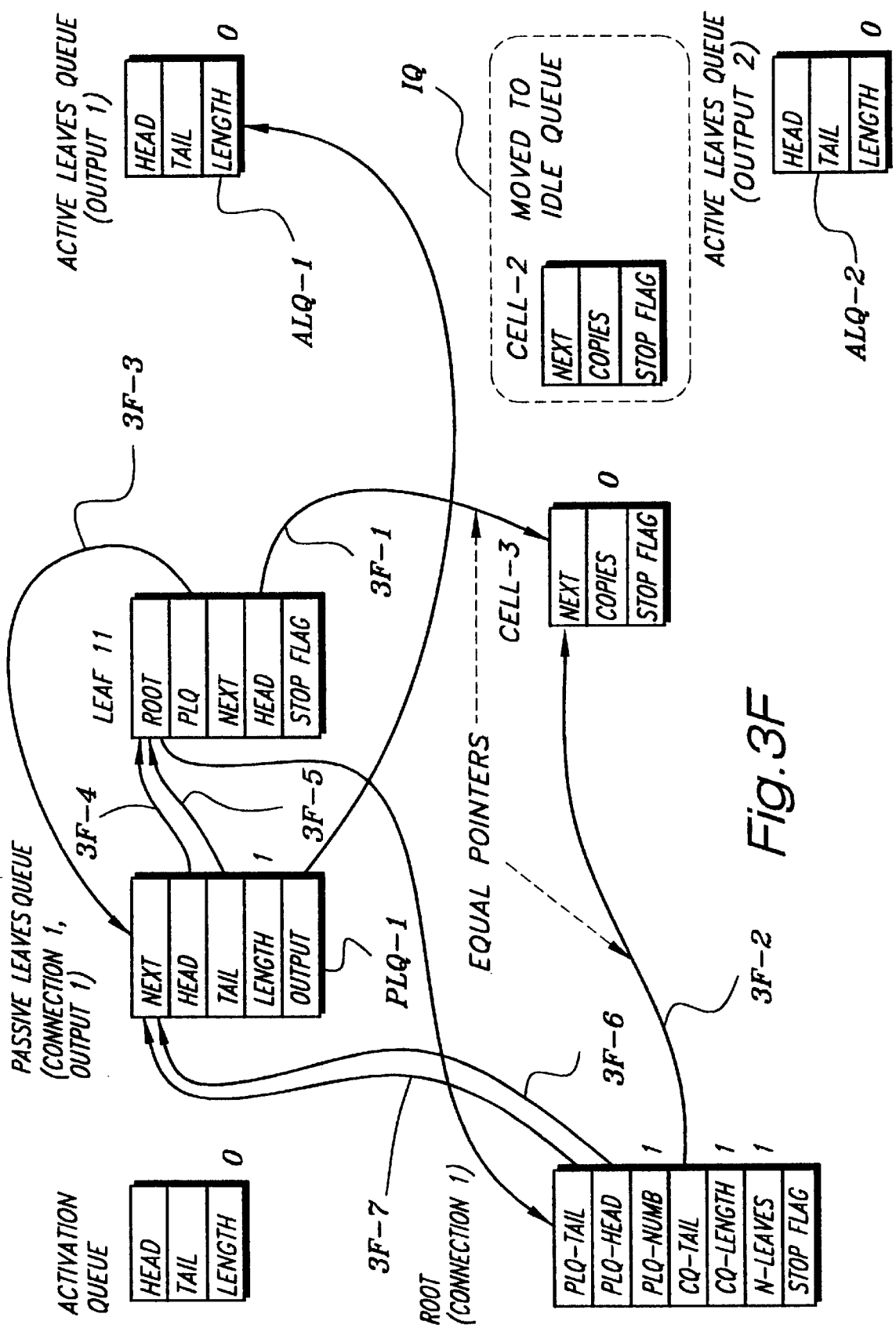

FIG. 3F shows Cell-2 being read by LEAF 11 as performed by the read logic circuitry 32. As explained in connection with FIG. 3E, the cell-to-be-read is pointed to by the field Next in the cell that is in turn pointed to by field Head in LEAF 11. Accordingly, since (as shown in FIG. 3E) the field Next in LEAF 11 points to Cell-2, the value of the Next field in Cell-2 is consulted to determine which cell should next be read. Since, as shown in FIG. 3E, the Next field of Cell-2 points to Cell-3, Cell-3 is read in FIG. 3F. When a cell is read from a leaf, the value of the field Head for that leaf is updated and compared with the value in field CQ-tail of the ROOT table. If these two values are equal, there are no more cells for the leaf to read. Such actually occurs in FIG. 3F, in which the updated value for field Head of LEAF 11 (as shown by arrow 3F-l) equals the value in field CA-tail of the ROOT table (as indicated by arrow 3F-2). Since there are no more cells for LEAF 11 to read, LEAF 11 is removed from queue ALQ-1 in the ACTIVE LEAVES QUEUE data structure and instead put in queue PLQ-1 of the PASSIVE LEAVES QUEUE data structure. This is accomplished by removing the pointers to LEAF 11 from the Head and Tail fields of ALQ-1, and by putting a pointer to PLQ-1 in the PLQ field of LEAF 11 (as indicated by arrow 3F-3 of FIG. 3F). Concomitantly, the Head and Tail fields of PLQ-1 are set to point to LEAF 11, as reflected by arrows 3F-4 and 3F-5, respectively. As the added leaf was the first in the PLQ (length=0), the PLQ is in turn added to the queue of PLQs of the corresponding root. This is shown by arrows 3F-6 and 3F-7 in FIG. 3F.

4.0 EXAMPLE—ADDING NEW LEAVES TO AN EXISTING CONNECTION

FIG. 4A–FIG. 4F illustrate events performed in adding new leaves to an existing connection. In the example scenario described in FIG. 4A–FIG. 4F, for sake of simplicity again only two outputs are assumed, although it should be understood that a different number (e.g., greater) of outputs can be utilized in other scenarios. Moreover, at the time shown in FIG. 4A, it is assumed that LEAF 11 has been set up at an earlier time, and in addition that LEAF 11 is active (i.e., is reading cells from the cell queue). In fact, in FIG. 4A–FIG. 4F queue ALQ-1 in the ACTIVE LEAVES QUEUE data base is assumed to contain leaves of other connections. Although such other leaves are not shown in FIG. 4A, arrows 4A-1 and 4A-2 reflect the existence of such other leaves. Also, the Next field of LEAF 11 points to another active leaf (as indicated by arrow 4A-3 in FIG. 4A).

Figure 4A:
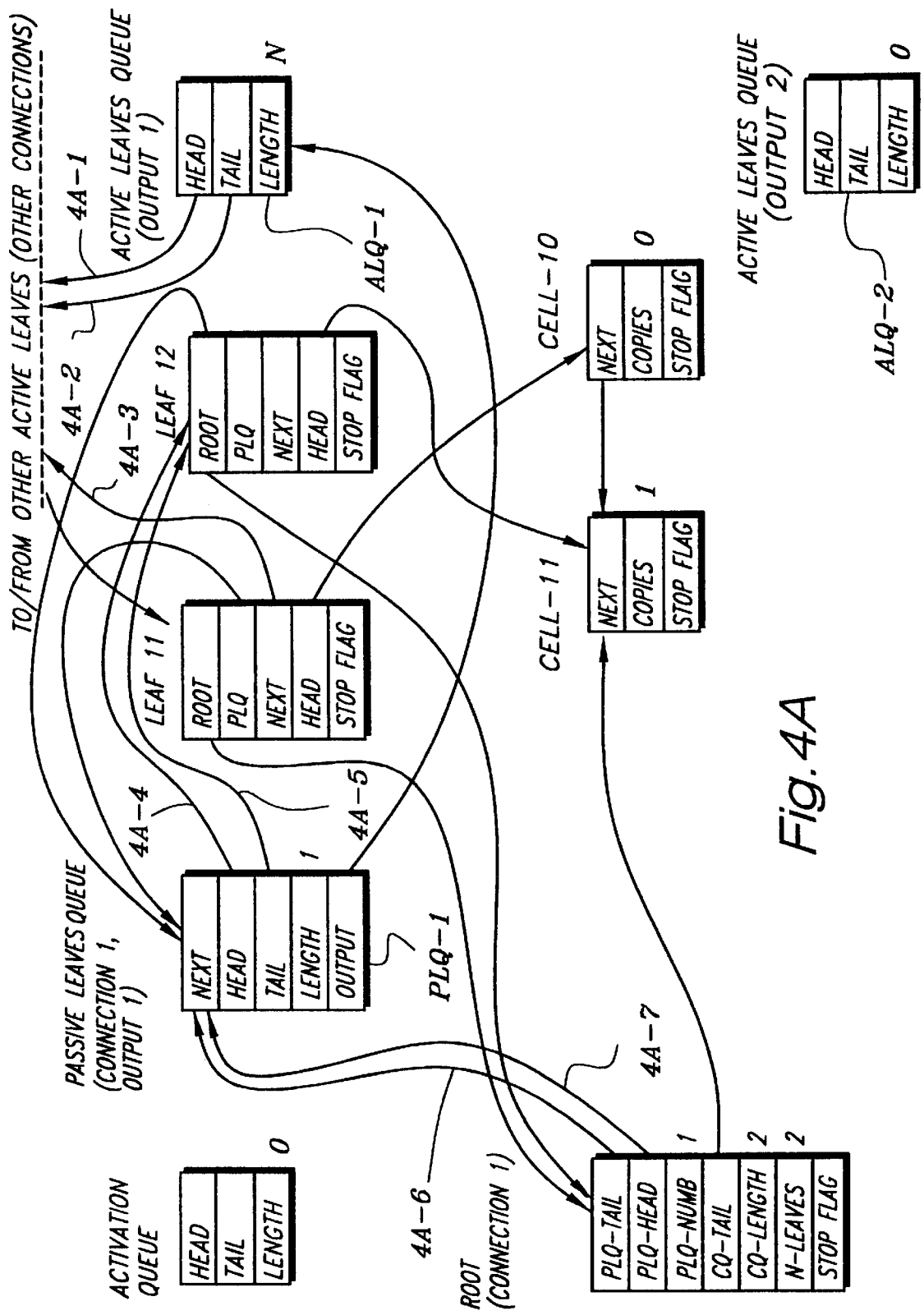

As shown in FIG. 4A, leaf 12 is set up by the read logic circuitry 32, and is linked to the queue PLQ-1 in the PASSIVE LEAVES QUEUE data structure and PLQ-1 is linked to the ROOT table. In connection with such linking, since LEAF 11 is active, the Head and Tail fields of queue PLQ-1 in the PASSIVE LEAVES QUEUE data structure are set to point to LEAF 12, as shown by arrows 4A-4 and 4A-5, respectively, in FIG. 4A. Via PLQ-1, LEAF 12 is linked to the ROOT table since the Head and Tail fields of queue PLQ-1 point to LEAF 12 as above described, and since the values in field PLQ-tail and PLQ-head of the ROOT table point to queue PLQ-1 (as indicated by arrows 4A-6 and 4A-7, respectively).

Figure 4B:
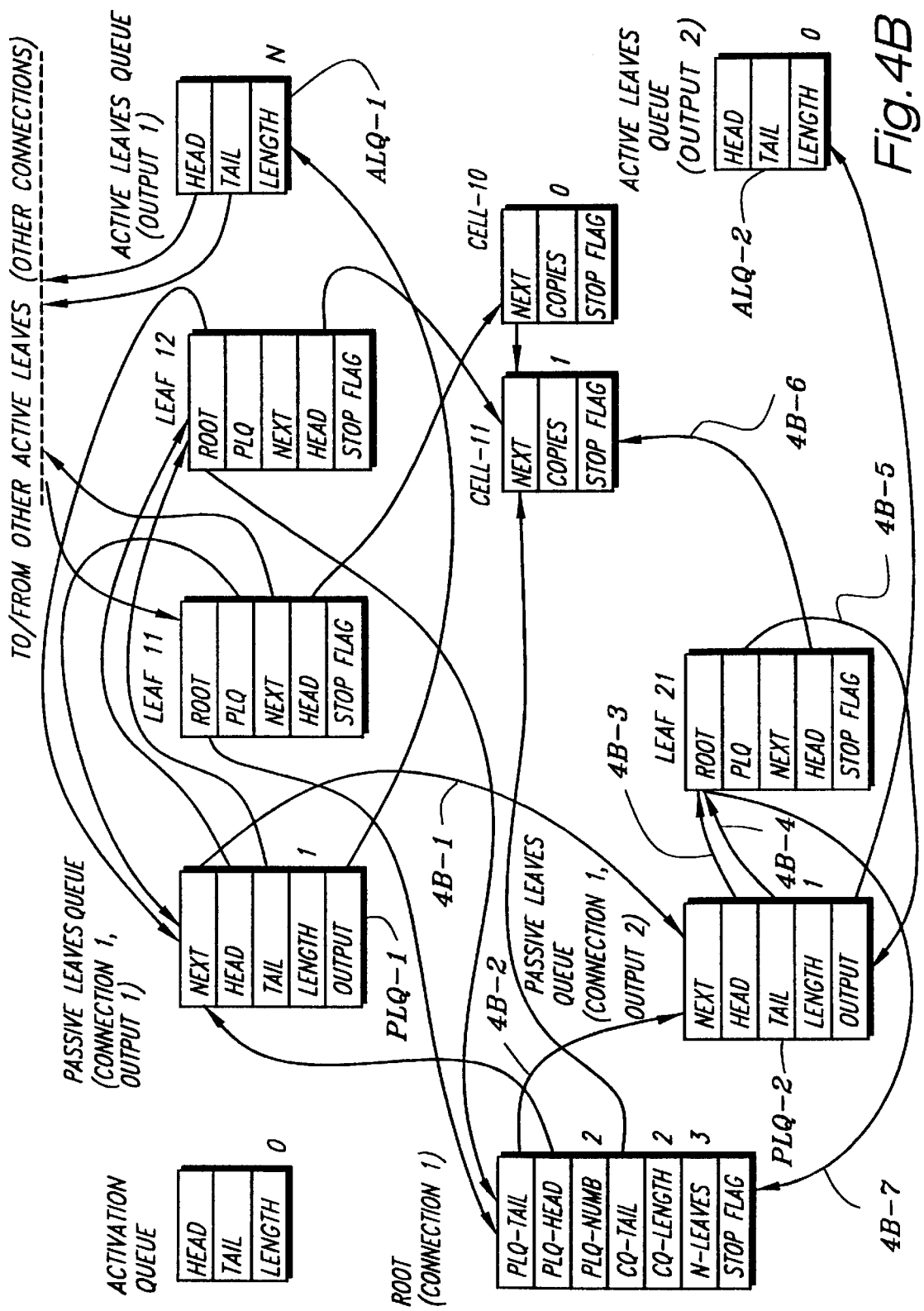

FIG. 4B shows the setting up of a first leaf by read logic circuitry 32, particularly LEAF 21, for the second output. In setting up a first leaf for another (the second) output, a queue PLQ-2 is initiated in the PASSIVE LEAVES QUEUE data structure. As indicated by arrow 4B-1, the queue PLQ-2 is linked to PLQ-1 for this root by setting the value in field Next of queue PLQ-1 and the value in field PLQ-Tail of the ROOT table to point to PLQ-2, as reflected by arrows 4B-1 and 4B-2, respectively, in FIG. 4B. In addition, the counter in field PLQ-numb is incremented to two, reflecting the existence of both PLQ-1 and PLQ-2. The Head and Tail fields of PLQ-2 are set to point to the new LEAF 21 (as indicated by arrows 4B-4 and 4B-4, respectively), and the PLQ field of LEAF 21 is set to point to PLQ-2 (as indicated by arrow 4B-5). The Head field of LEAF 21 is set to point to the cell that currently is pointed to by the CQ-tail pointer in the Root entry (e.g., Cell-11 in FIG. 4B, as shown by arrow 4B-6). The Root field of LEAF 21 is set to point to the ROOT table, as indicated by arrow 4B-7.

Figure 4C:
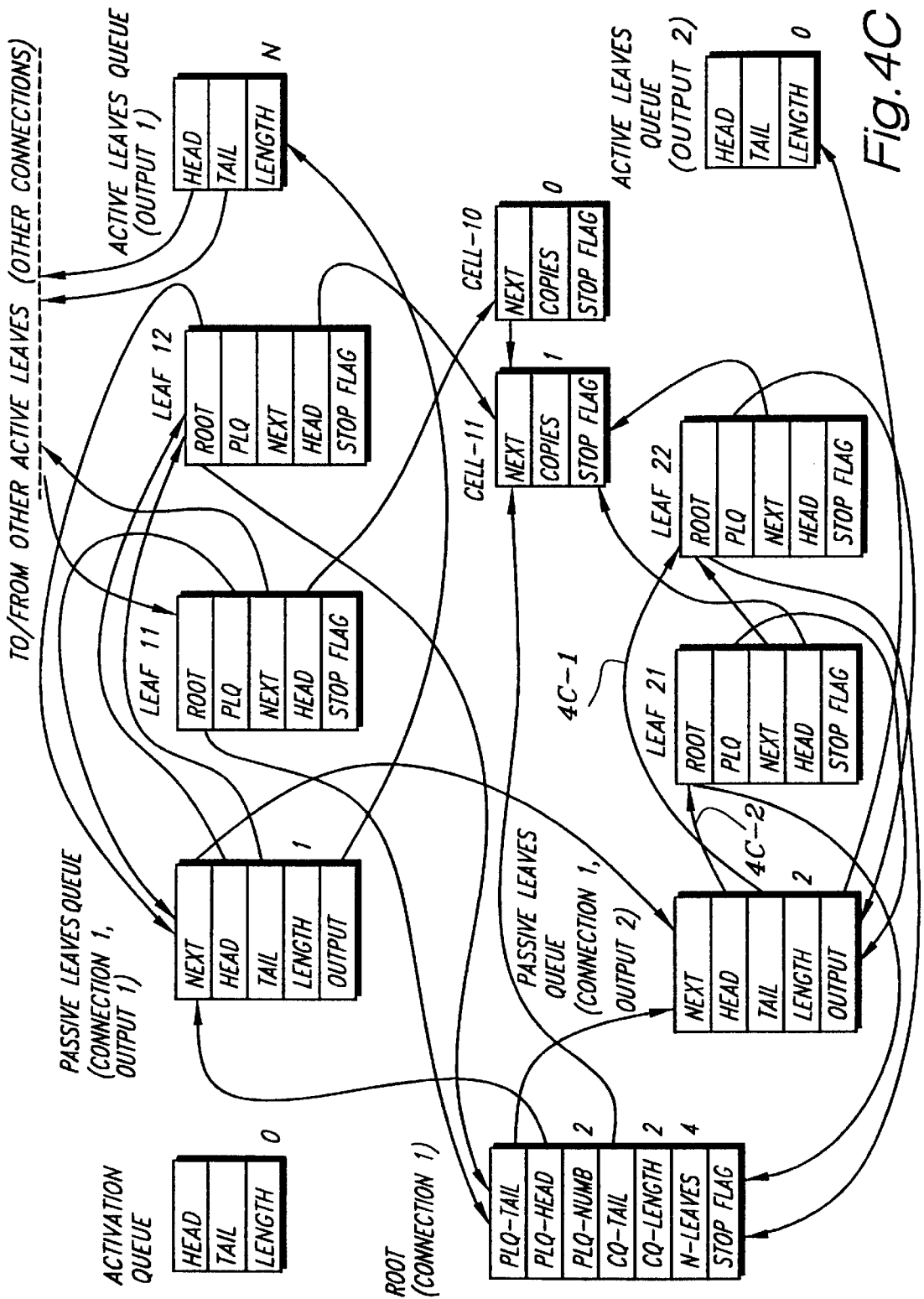

FIG. 4C shows set up of a second leaf by read logic circuitry 32, particularly LEAF 22, for the second output. LEAF 22 is linked to the queue PLQ-2 in the PASSIVE LEAVES QUEUE data structure by (1) setting the value in field Tail of PLQ-2 to point to LEAF 22 [as indicated by arrow 4C-1] and (2) setting the value of field Next in LEAF 21 to point to LEAF 22 [as indicated by arrow 4C-2]. In addition, the counter in field Length of queue PLQ-2 is incremented, now holding the value two (since there are two passive leaves, i.e., LEAF 21 and LEAF 22, tracked by queue PLQ-2). At the time shown in FIG. 4C, no more cells have been read by LEAF 11 (which remains active) and no more cells have been received from the switch core.

Figure 4D:
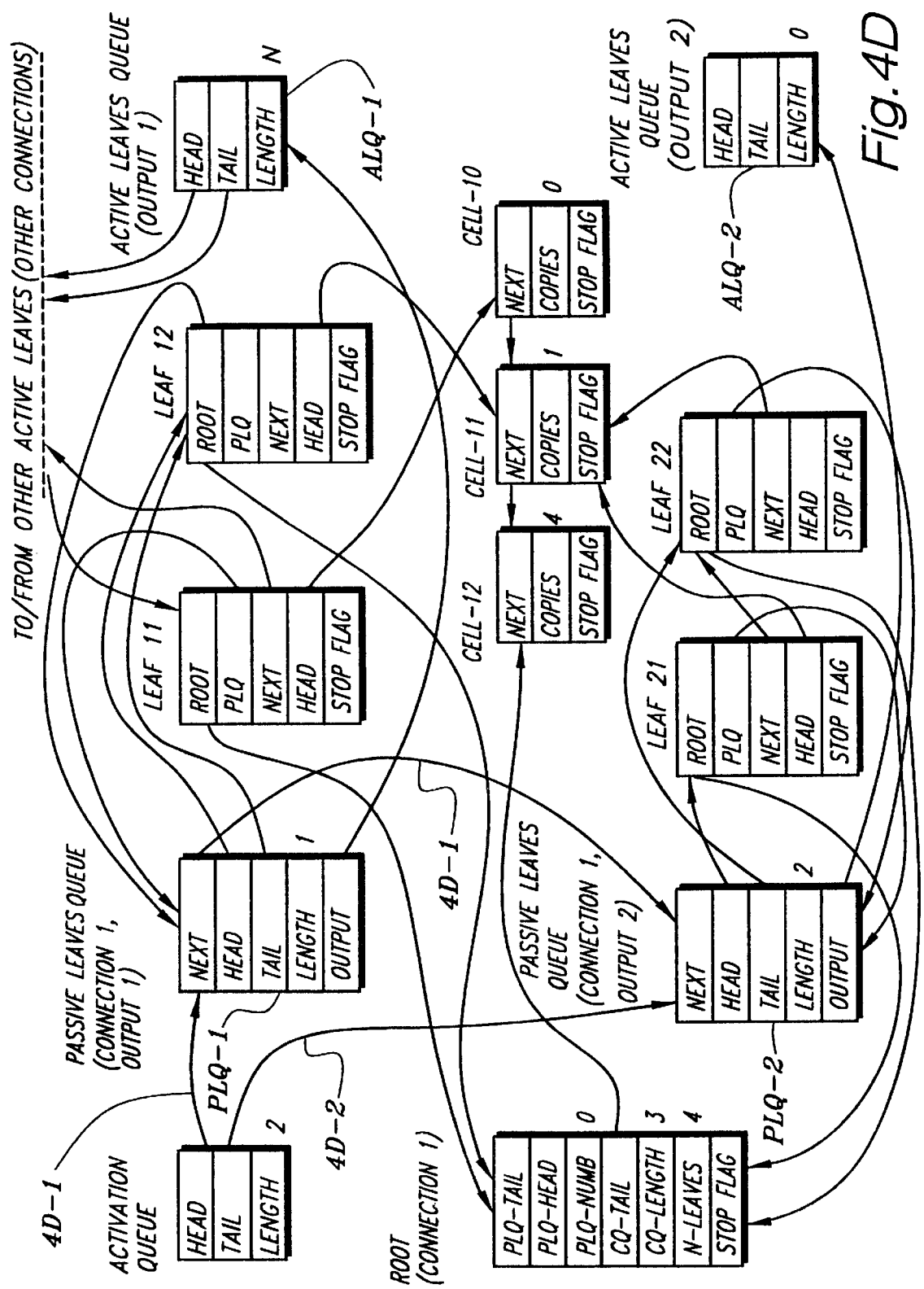

FIG. 4D shows entry of a cell from the switch core, particularly Cell-12, and actions performed by write logic circuitry 30. It is to be noted that the number of leaves for Cell-12 is four, and accordingly that the value of the Copies field for Cell-12 is set to four (equal to N-leaves).

Entry of Cell-12 as shown in FIG. 4D causes both queue PLQ-1 and queue PLQ-2 to be moved by the write logic circuitry 30 into the ACTIVATION QUEUE (AQ). In this regard, the Head field of the ACTIVATION QUEUE (AQ) is set to point to queue PLQ-1 (as shown by arrow 4D-1); the Tail field of the ACTIVATION QUEUE (AQ) is set to point to queue PLQ-2 (as shown by arrow 4D-2). It will be remembered that the Next field of PLQ-1 points to PLQ-2, as shown by arrow 4B-1, forming a complete linking of PLQ-1 and PLQ-2.

At the time shown in FIG. 4D, for simplicity the ACTIVATION QUEUE (AQ) is shown as having previously been empty. Of course, the ACTIVATION QUEUE (AQ) may also contain PLQs for other connections. In that case, only the Tail is set to point to PLQ-2, and the Next pointer of the PLQ previously pointed to by Tail is also set to point to PLQ-2.

In FIG. 4E, Cell-13 arrives from the switch core and is handled by the write logic circuitry 30. The counter CQ-length in the ROOT table is incremented. As with Cell-12, the number of leaves for Cell-13 is four, and accordingly that the value of the Copies field for Cell-13 is set to four. FIG. 4E also shows that queue LPQ-1 has been read out of the ACTIVATION QUEUE (AQ) in accordance with the activation logic circuitry 34, and that LEAF 12 has been activated. Whereas previously only LEAF 11 was activated, in FIG. 4E LEAF 12 is activated as well.

Reading out of PLQ-1 from the ACTIVATION QUEUE (AQ) is reflected by the fact that, in FIG. 4E, field Head of the ACTIVATION QUEUE (AQ) no longer points to queue PLQ-1, but instead to queue PLQ-2 (as indicated by arrow 4E-1). Activation of LEAF 12 is understood by the fact that another (unillustrated) active leaf points to LEAF 12 (as indicated by arrow 4E-2), and the Tail field of ALQ-1 also points to LEAF 12 (as shown by arrow 4E-3).

Figure 4F:
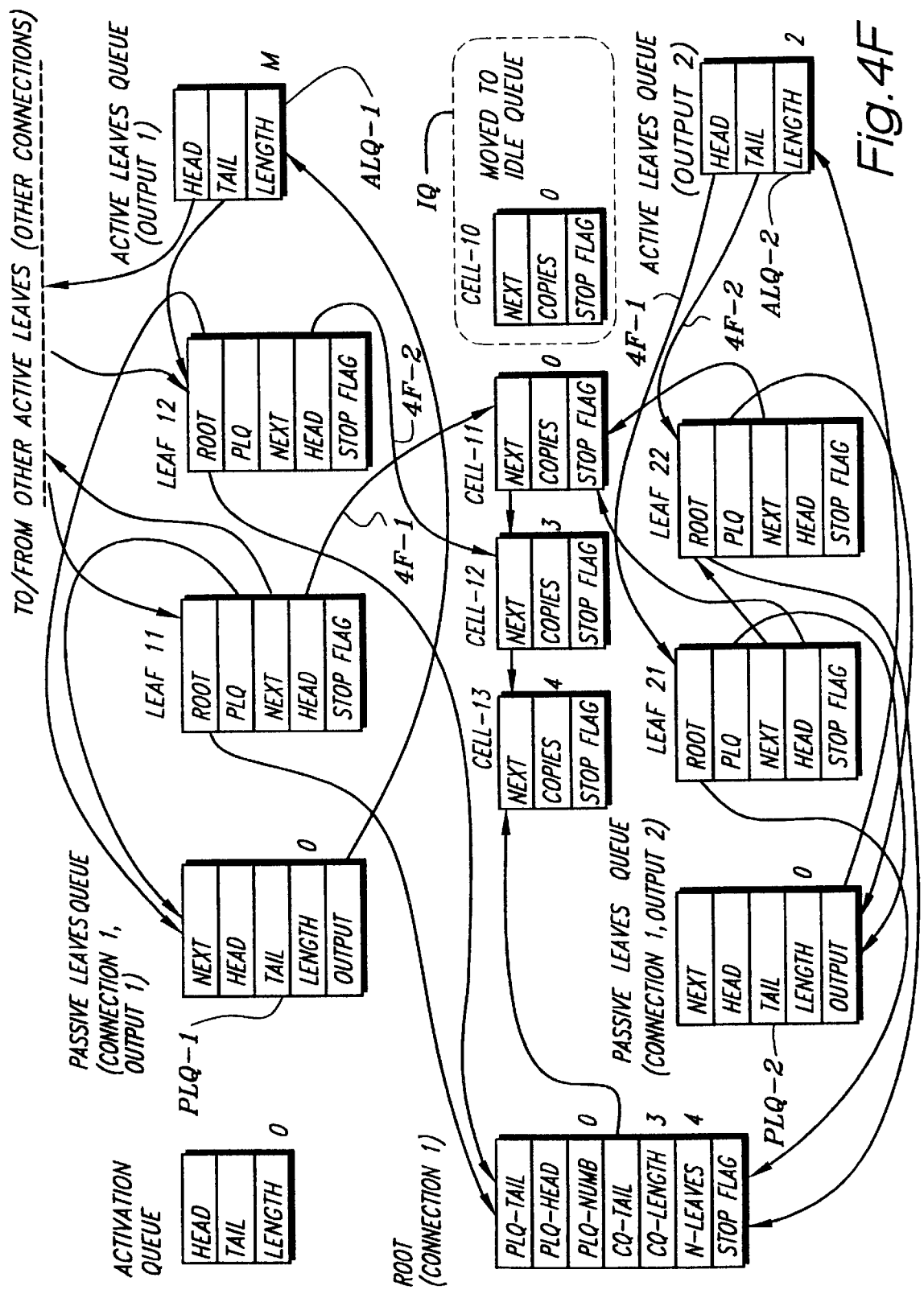

FIG. 4F shows reading of a cell by each of LEAF 11 and LEAF 21, as well as activation of queue PLQ-2 in the PASSIVE LEAVES QUEUE data structure. Regarding the reading of a cell by LEAF 11 (accomplished by read logic circuitry 32), as shown in FIG. 4E the Head field of LEAF 11 previously pointed to Cell-10. Accordingly, the value of the Next field of Cell-10 is utilized to point to the next cell to be read out, i.e., Cell-11. When Cell-11 is read out by LEAF 11, the counter in the field Copies of Cell-11 is decremented to zero. The pointer in field Head of LEAF 11 is then updated to point to Cell-11, as shown by arrow 4F-1.

Since Cell-10 is no longer pointed to by a field Head for any leaf, Cell-10 is moved to the IDLE QUEUE (IQ). The counter in field CQ-length in the ROOT table is then decremented (reaching the value three in FIG. 4F).

Similarly, with respect to the reading of a cell by LEAF 12 in FIG. 4F, as shown in FIG. 4E the Head field of LEAF 12 previously pointed to Cell-11. Accordingly, the value of the Next field of Cell-11 is utilized to point to the next cell to be read out, i.e., Cell-12. When Cell-12 is read out by LEAF 12, the counter in the field Copies of Cell-12 is decremented from four to three. Moreover, the pointer in field Head of LEAF 12 is then updated to point to Cell-12, as shown by arrow 4F-2.

FIG. 4F also shows activation of queue PLQ-2 in the PASSIVE LEAVES QUEUE data structure as performed by the activation logic circuitry 34. That is, reference to PLQ-2 is removed from the ACTIVATION QUEUE (AQ). Moreover, in view of the activation of queue PLQ-2, LEAF 21 and LEAF 22 are linked into queue ALQ-2 in the ACTIVE LEAVES QUEUE data structure. In this regard, the field Head of ALQ-2 is set to point to LEAF 21 (as indicated by arrow 4F-1) and the field Tail of ALQ-2 is set to point to LEAF 22 (as indicated by arrow 4F-2). It will be recalled that the field Next of LEAF 21 had previously been set to point to LEAF 22, whereby in FIG. 4F both LEAF 21 and LEAF 22 are linked into ALQ-2.

Thus, as explained above, FIG. 4A–FIG. 4F illustrate the adding of new leaves to an existing connection. It has been shown how, for a second output, a second queue was established in the PASSIVE LEAVES QUEUE data structure, particularly queue PLQ-2, and how the links assigned to such queue are rendered active and passive.

5.0 EXAMPLE—TEARING DOWN A LEAF

FIG. 5A–FIG. 5D illustrate events performed in removing, e.g., tearing down, a leaf from an existing connection. In the example scenario described in FIG. 5A–FIG. 5D, for sake of simplicity again only two outputs are assumed, although it should be understood that a different number (e.g., greater) of outputs can be utilized in other scenarios. Moreover, at the time shown in FIG. 5A, two leafs, particularly LEAF 11 and LEAF 21, exist and both LEAF 11 and LEAF 21 are active. Three cells, Cell-20, Cell-21, and Cell-22, are in the cell queue.

Figure 5A:
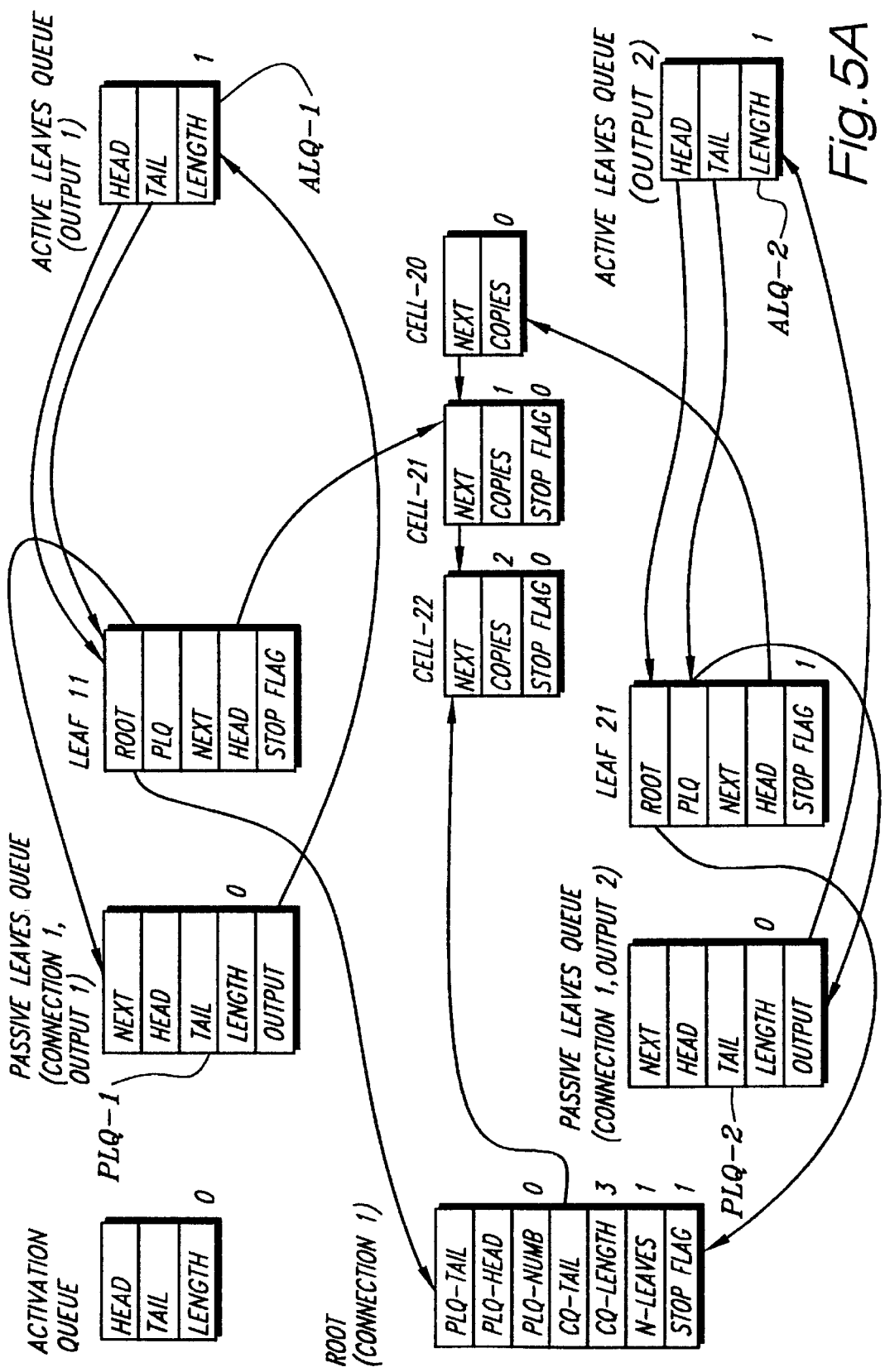

At the time shown in FIG. 5A, LEAF 21 is to be torn down, i.e., removed from the connection. Such is indicated by the fact that the Stop Flag of the root table now has the value "1" and the Stop Flag of LEAF 21 also has the value "1". These Stop Flag values were set in accordance with the steps 2C-3 and 2C-5 of FIG. 2C. Moreover, whereas prior to the time shown in FIG. 5A the value of the counter in field N-leaves of the ROOT table was two, FIG. 5A shows decrementation of field N-leaves to one in view of the removal of LEAF 21 (step 2C-5).

Figure 5B:
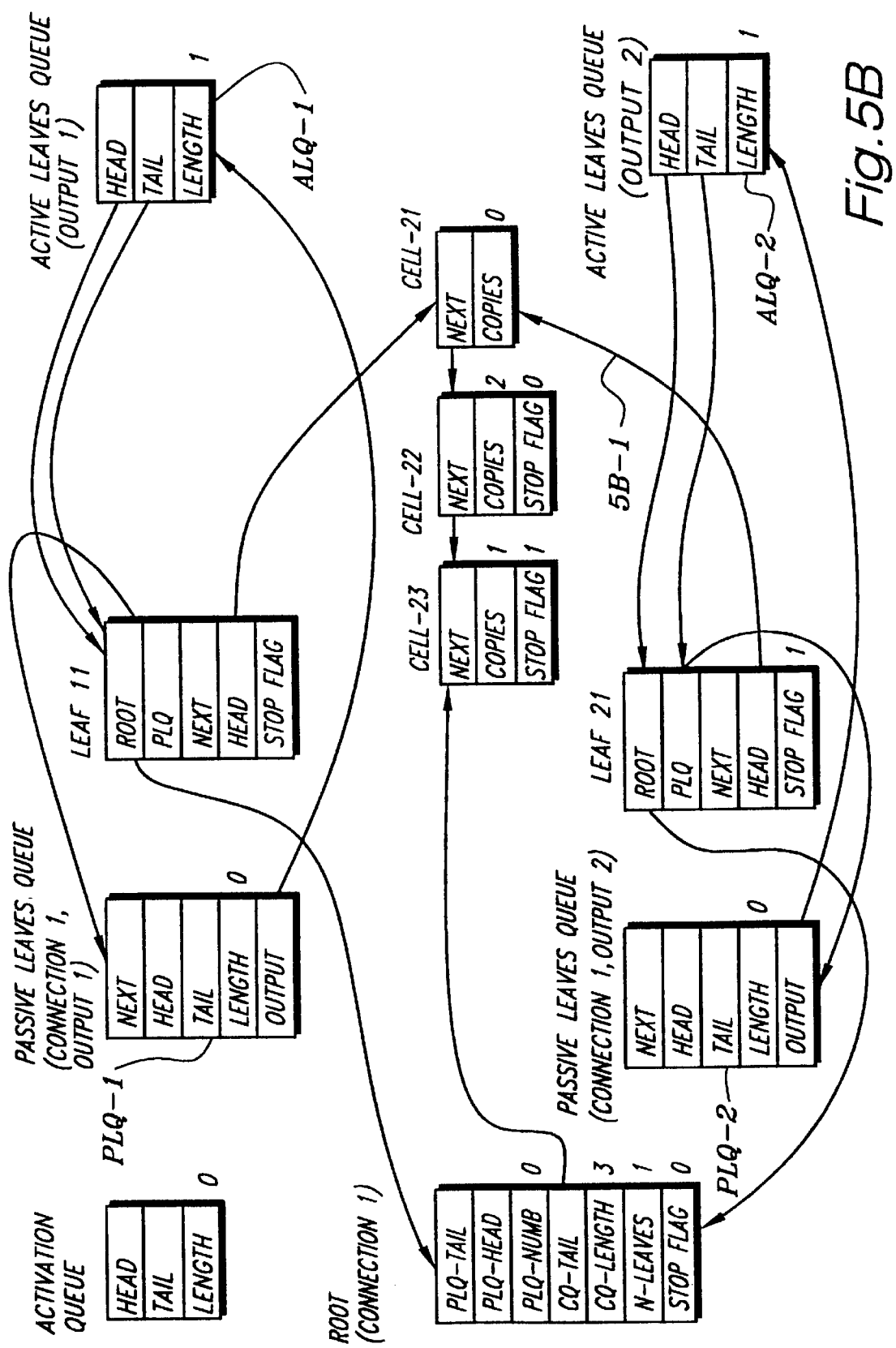

FIG. 5B shows both arrival of a new cell, i.e., Cell-23 from the switch core, as well as reading of Cell-21 by LEAF 21. Since the write logic circuitry 30 sets the field N-leaves in the ROOT table to one for Cell-23, the field Copies in Cell-23 is likewise set to one. Reception of Cell-23 causes incrementation of counter CQ-length in the ROOT table, but in view of moving of Cell-20 to the IDLE QUEUE, decrementation of counter CQ-length returns the value of counter CQ-length to three as shown in FIG. 5B.

Entry of a new cell, i.e., Cell-23, after receipt of an order for leaf removal, causes the new cell to have its Stop Flag field set to "1" and for the Stop Flag field in the ROOT table to be set back to zero ("0"), as shown in FIG. 5B. Thereafter, whenever the stop-marked leaf reads a cell, such as Leaf 21 having its Stop Flag set to "1", a check is made whether the cell being read is stop-marked (i.e., has its Stop Flag set to "1").

In reading a cell, the Head field of LEAF 21 previously pointed to Cell-20 as shown in FIG. 5A. Accordingly, the pointer in field Next of Cell-20 is utilized to determine which cell is next to be read by LEAF 21, i.e., Cell-21. Leaf 21 checks to ensure that Cell-21 is not stop-marked, which it is not (since Cell-21 has its Stop Flag set to zero). After reading of Cell-21, the field Head of LEAF 21 is updated to point to Cell-21 (as shown by arrow 5B-1), and the Copies field of Cell-21 is decremented (now reaching zero as shown in FIG. 5B).

FIG. 5C shows that LEAF 21 has read also Cell-22 in a manner described in connection with FIG. 5B, and is just about to read the next cell. When doing so, the value in field Head of LEAF 21 is consulted and determined to point to Cell-22. The field Next of Cell-22 is then used to get a pointer to the next cell to be read by LEAF 21. The field Next of Cell-22 points to Cell-23.

When LEAF 21 attempts next to read Cell-23, LEAF 21 will notice that Cell-23 is stop-marked (i.e., the Stop Flag of Cell-23 is set to "1"). In such case, Cell-23 will not be read out. Instead, LEAF 21 is removed and not put back into any queue. The Stop Flag of Cell-23 is then set back to zero.

Figure 5D:
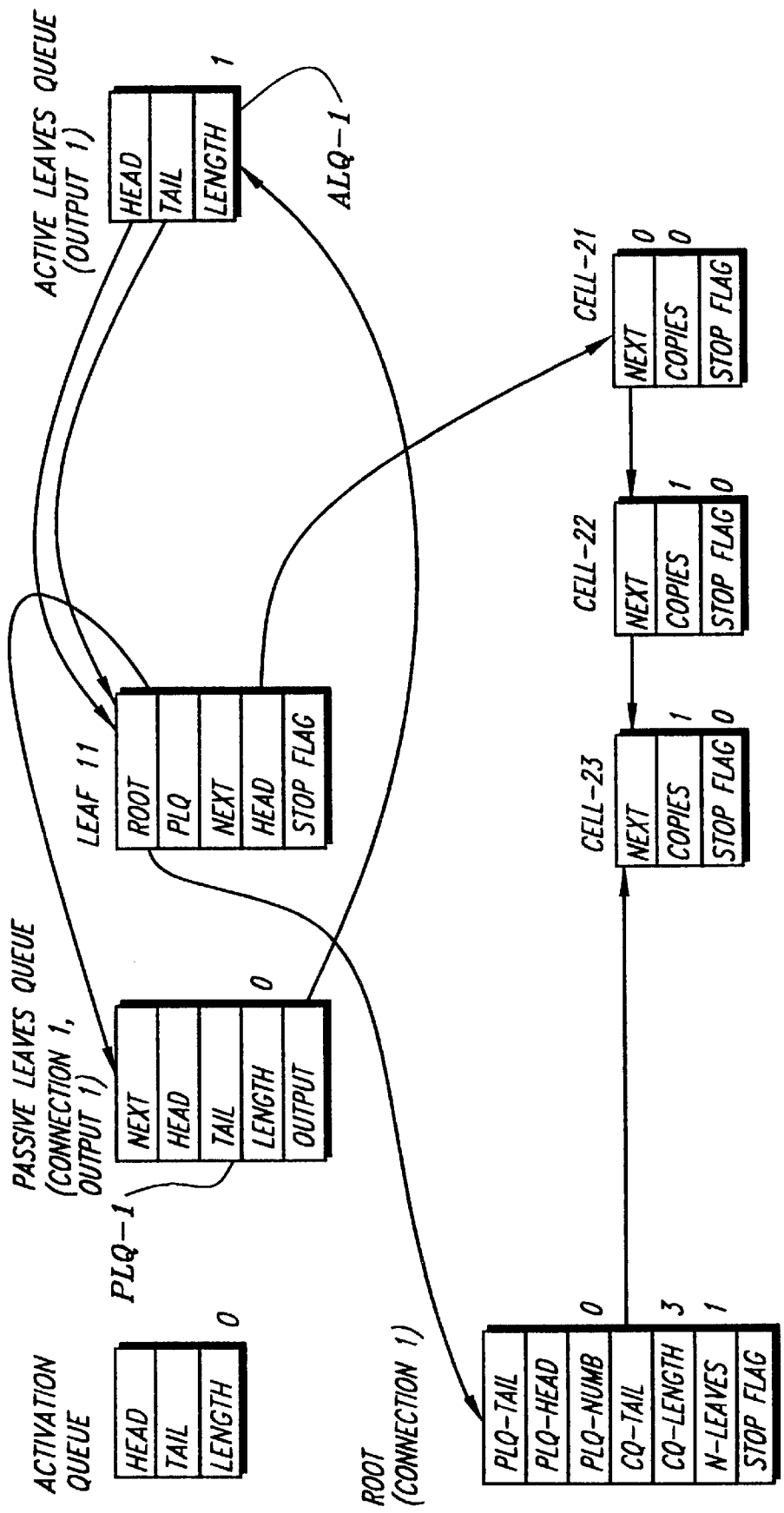

FIG. 5D shows that LEAF 21 has been removed, as explained previously in connection with FIG. 5C. The fact that Cell-22 has been read out by LEAF 21 is reflected by decrementation of field Copies for Cell-22. Since LEAF 21 has been removed, and since queue PLQ-2 only had entries for LEAF 21, queue PLQ-2 in the PASSIVE LEAVES QUEUE data structure is also removed. Moreover, all cells have the correct value in their Copies field. Cell-23 has its Stop Flag set at zero.

Thus, there has been described techniques by which, for multicast cells, leaves are added and removed on the fly for existing connections.

Moreover, in the present invention, there is efficient and economical handling of active and passive leaves. It has been seen that, in accordance with the present invention, that, for a passive leaf of the multicast cell, there is a linking the leaf table for the passive leaf to an appropriate passive leaves queue. However, upon reception of a cell from a switch core, the appropriate one of the passive leaves queues is linked to an activation queue. Thereafter a pointer is set in an active leaves queue to a leaf table pointed to by the appropriate one of the passive leaves queues.

Advantageously, the present invention requires a short activation time. The present invention minimizes activation time e.g., by allowing all leaves in one PLQ to be activated by one single relinkage of the chain of leaves from the PLQ to the ALQ.

While the invention has been particularly shown and described with reference to the preferred embodiments thereof, it will be understood by those skilled in the art that various alterations in form and detail may be made therein without departing from the spirit and scope of the invention. For example, several quality of service classes may be introduced by adding more lists of active leaves, and a scheduling mechanism between the lists that are associated with the same physical output link.

The embodiments of the invention in which an exclusive property or privilege is claimed are defined as follows:

1. An ATM switch having an egress port which receives cells from an ATM switch core, the egress port having a plurality of physical outputs and comprising:

a root data structure having an entry for each multicast connection;

a leaf data structure having a leaf entry for each leaf of the multicast connection;

a cell buffer in which are stored cells received from the ATM switch core;

a passive leaves queue to which leaf entries for passive leaves are linked;

an active leaves queue to which leaf entries for active leaves are linked, there being one active leaves queue for each physical output;

wherein, when a new cell enters the cell buffer, plural leaf entries linked to a passive leaves queue are relinked to a corresponding active leaves queue.

2. The apparatus of claim 1, wherein the memory further comprises a root table, and wherein the logic circuit links the appropriate one of the passive leaves queues to the activation queue using a pointer to the appropriate one of the passive leaves queues as stored in the root table.

3. The apparatus of claim 1, wherein the memory further comprises a cell buffer utilized to determine what cells, obtained from a switch core, are to be read out of the switching device, and wherein, for an active leaf, the logic circuit keeps the pointer in an appropriate one of the active leaves queues until there are no more cells in cell buffer to be read out for the active leaf.

4. The apparatus of claim 3, wherein the memory further comprises a root table, and wherein the logic circuit determines whether there are no more cells in the cell buffer to be read out for the active leaf by comparing a head pointer stored in the leaf table to a cell buffer tail pointer stored in the root table, the head pointer stored in the leaf table pointing to the last cell in the cell buffer read by the leaf for the active link and the cell buffer tail pointer pointing to the last cell in the cell buffer.

5. The apparatus of claim 1, wherein the memory further comprises a root table and a cell buffer, the cell buffer being utilized to determine what cells, obtained from a switch core, are to be read out of the switching device, and wherein the root table has stored therein a number of entries in the cell buffer; an address of the last cell in the cell buffer; and a number of leaves for the most recently received cell pointed to by the cell buffer.

6. The apparatus of claim 1, wherein the memory further comprises a root table, and wherein the root table has stored therein a head pointer to a first passive leaves queue and tail pointer to a last passive leaves queue.

7. The apparatus of claim 6, wherein the first passive leaves queue has stored therein a next pointer to a next passive leaves queue for linking the next passive leaves queue to the first passive leaves queue.

8. The apparatus of claim 1, wherein the memory further comprises a root table and a cell buffer, the cell buffer being utilized to determine what cells, obtained from a switch core, are to be read out of the switching device, and wherein a specified leaf is to be removed when the specified leaf attempts to read a cell for which a stop flag has been set, the stop flag having been set for a first cell to enter from a switch core after a command has issued to remove the leaf.

9. A method for operating an Asynchronous Transfer Mode (ATM) switching device through which ATM cells are routed to one or more of a plurality of physical output links, the method comprising:

(1) establishing, in a memory:

(i) passive leaves queues for each of a plurality of physical output links to which a multicast connection is destined; and (ii) a leaf table for each leaf of the multicast connection as each leaf is added, the leaf table including a pointer for determining a next cell to be read out of a cell buffer for the respective leaf;

(2) for a passive leaf of the multicast connection, linking the leaf table for the passive leaf to an appropriate one of the passive leaves queues;

(3) upon reception of a cell from a switch core, linking the appropriate one of the passive leaves queues to an activation queue and thereafter setting a pointer in an active leaves queue to a leaf table pointed to by the appropriate one of the passive leaves queues.

10. The method of claim 9, wherein linking the appropriate one of the passive leaves queues to the activation queue comprises using a pointer to the appropriate one of the passive leaves queues as stored in a root table.

11. The method of claim 9, further comprising, for an active leaf, keeping the pointer in an appropriate one of the active leaves queues until there are no more cells in the cell buffer to be read out for the active leaf.

12. The method of claim 11, further comprising determining whether there are no more cells in the cell buffer to be read out for the active leaf by comparing a head pointer stored in the leaf table to a cell buffer tail pointer stored in the root table, the head pointer stored in the leaf table pointing to the next cell in the cell buffer for the active link and the cell buffer tail pointer pointing to the last cell in the cell buffer.

13. The method of claim 9, further comprising removing a specified leaf when the specified leaf attempts to read a cell for which a stop flag has been set, the stop flag having been set for a first cell to enter from a switch core after a command has issued to remove the leaf.

14. An ATM switch having an egress port which receives cells from an ATM switch core, the egress port having a plurality of physical outputs and comprising:

a root data structure having an entry for each multicast connection;

a leaf data structure having a leaf entry for each leaf of the multicast connection;

a cell buffer in which are stored cells received from the ATM switch core;

a passive leaves queue to which leaf entries for passive leaves are linked;

an active leaves queue to which leaf entries for active leaves are linked, there being one active leaves queue for each physical output;

wherein, when a new cell enters the cell buffer, all leaf entries linked to a passive leaves queue are relinked to a corresponding active leaves queue.

15. The ATM switch of claim 14, further comprising:

an activation queue;

a write logic circuit;

an activation logic circuit; and wherein, when a new cell enters the cell buffer, the passive leaves queue is linked to the activation queue by the write logic circuit and the activation logic circuit uses the activation queue and the passive leaves queue to link the leaf entries to the corresponding active leaves queue.

16. The ATM switch of claim 14, wherein, when a new leaf is set up for an existing connection, a leaf entry for the new leaf is set up in the leaf data structure and is linked to the passive leaves queue for the existing connection.

17. The ATM switch of claim 14, wherein, when a new connection is set up, a passive leaves queue is set up for the new connection and linked to previously existing passive leaves queues and to the root data structure.

18. The ATM switch of claim 14, wherein, when a selected leaf entry is to be removed, a stop flag field in the selected leaf entry is set to a predetermined stop value and a stop flag field in a next received cell from the switch core is set to a predetermined stop value, whereby when the selected leaf entry to be removed attempts to read the next received cell, the selected leaf entry is removed.

19. The ATM switch of claim 18, whereby when the selected leaf entry is removed, the stop flag in the next received cell is changed from the predetermined stop value.

20. The ATM switch of claim 14, wherein, when a new cell enters the cell buffer, all leaf entries linked to a passive leaves queue are relinked to a corresponding active leaves queue.

21. A switching device through which cells are routed to one or more of a plurality of physical output links, the switching device comprising:
a cell buffer which receives cells from a switch core;
a leaf table for each leaf of a multicast connection, each leaf table having a pointer to a corresponding cell in the cell buffer whereby the pointers of differing leaf table may point to differing cells in the cell buffer, and wherein a passive leaf has its leaf table pointing to a last cell in the cell buffer and an active leaf has its leaf table pointing to other than a last cell in the cell buffer.

22. The apparatus of claim 21, further comprising:
an activation queue;
an active leaves queue for a physical output link; and
wherein the passive leaf is activated by placing the passive leaf in the activation queue and then in the active leaves queue.

23. The apparatus of claim 22, wherein, when a new cell enters the cell buffer and the passive leaf is activated, the previously last cell in the cell buffer has a pointer pointing to the new cell, and whereby the pointer of the passive leaf table is updated by using the pointer of the previously last cell in the cell buffer to point to the position in the cell buffer occupied by the new cell.

24. The apparatus of claim 21, further comprising:
an activation queue;
an active leaves queue for a physical output link; and
a logic circuit which, upon reception of a cell from the switch core, links the passive leaves queue to the activation queue and thereafter sets a pointer in the active leaves queue to the leaf table.

25. The apparatus of claim 24, further comprising a root table, and wherein the logic circuit links the passive leaves queue to the activation queue using a pointer to the passive leaves queue as stored in the root table.

26. The apparatus of claim 24, further comprising a root table, and wherein the logic circuit determines whether there are no more cells in the cell buffer to be read out for an active leaf by comparing a head pointer stored in the leaf table to a cell buffer tail pointer stored in the root table, the head pointer stored in the leaf table pointing to the last cell in the cell buffer read by the leaf for the active link and the cell buffer tail pointer pointing to the last cell in the cell buffer.

27. The apparatus of claim 24, further comprising a root table, the cell buffer being utilized to determine what cells, obtained from a switch core, are to be read out of the switching device, and wherein the root table has stored therein a number of entries in the cell buffer; an address of the last cell in the cell buffer; and a number of leaves for the most recently received cell pointed to by the cell buffer.

28. The apparatus of claim 24, further comprising a root table, and wherein the root table has stored therein a head pointer to a first passive leaves queue and tail pointer to a last passive leaves queue.

29. The apparatus of claim 28, wherein the first passive leaves queue has stored therein a next pointer to a next passive leaves queue for linking the next passive leaves queue to the first passive leaves queue.

30. The apparatus of claim 24, further comprising a root table, the cell buffer being utilized to determine what cells, obtained from a switch core, are to be read out of the switching device, and wherein a specified leaf is to be removed when the specified leaf attempts to read a cell for which a stop flag has been set, the stop flag having been set for a first cell to enter from a switch core after a command has issued to remove the leaf.

31. An cell egress device which receives cells from a switch core and through which cells are routed to one or more of a plurality of physical output links, the device comprising:
a cell buffer which receives cells from the switch core;
a leaf table for each leaf of a multicast connection, each leaf table having a pointer to a corresponding cell in the cell buffer whereby the pointers of differing leaf table may point to differing cells in the cell buffer, and wherein a passive leaf has its leaf table pointing to a last cell in the cell buffer and an active leaf has its leaf table pointing to other than a last cell in the cell buffer.

32. The apparatus of claim 31, further comprising:
an activation queue;
an active leaves queue for a physical output link; and
wherein the passive leaf is activated by placing the passive leaf in the activation queue and then in the active leaves queue.

33. The apparatus of claim 32, wherein, when a new cell enters the cell buffer and the passive leaf is activated, the previously last cell in the cell buffer has a pointer pointing to the new cell, and whereby the pointer of the passive leaf table is updated by using the pointer of the previously last cell in the cell buffer to point to the position in the cell buffer occupied by the new cell.

34. The apparatus of claim 31, further comprising:
an activation queue;
an active leaves queue for a physical output link; and
a logic circuit which, upon reception of a cell from the switch core, links the passive leaves queue to the activation queue and thereafter sets a pointer in the active leaves queue to the leaf table.

35. The apparatus of claim 34, further comprising a root table, and wherein the logic circuit links the passive leaves queue to the activation queue using a pointer to the passive leaves queue as stored in the root table.

36. The apparatus of claim 34, further comprising a root table, and wherein the logic circuit determines whether there are no more cells in the cell buffer to be read out for an active leaf by comparing a head pointer stored in the leaf table to a cell buffer tail pointer stored in the root table, the head pointer stored in the leaf table pointing to the last cell in the cell buffer read by the leaf for the active link and the cell buffer tail pointer pointing to the last cell in the cell buffer.

37. The apparatus of claim 34, further comprising a root table, the cell buffer being utilized to determine what cells, obtained from a switch core, are to be read out of the switching device, and wherein the root table has stored therein a number of entries in the cell buffer; an address of the last cell in the cell buffer; and a number of leaves for the most recently received cell pointed to by the cell buffer.

38. The apparatus of claim 34, further comprising a root table, and wherein the root table has stored therein a head pointer to a first passive leaves queue and tail pointer to a last passive leaves queue.

39. The apparatus of claim 38, wherein the first passive leaves queue has stored therein a next pointer to a next passive leaves queue for linking the next passive leaves queue to the first passive leaves queue.

40. The apparatus of claim 34, further comprising a root table, the cell buffer being utilized to determine what cells, obtained from a switch core, are to be read out of the switching device, and wherein a specified leaf is to be removed when the specified leaf attempts to read a cell for which a stop flag has been set, the stop flag having been set for a first cell to enter from a switch core after a command has issued to remove the leaf.

41. A method of operating a cell switching device comprising:

receiving cells from a switch core into a cell buffer;

providing a leaf table for each leaf of a multicast connection, each leaf table having a pointer to a corresponding cell in the cell buffer whereby the pointers of differing leaf table may point to differing cells in the cell buffer;

using a pointer of a passive leaf table of a passive leaf to point to a last cell in the cell buffer;

using a pointer of an active leaf table of an active leaf to point to other than a last cell in the cell buffer.

42. The method of claim 41, further comprising:

providing an activation queue;

providing an active leaves queue for a physical output link; and activating the passive leaf by placing the passive leaf in the activation queue and then in the active leaves queue.

43. The method of claim 42, wherein, when a new cell enters the cell buffer and the passive leaf is activated, the previously last cell in the cell buffer has a pointer pointing to the new cell, and whereby the pointer of the passive leaf table is updated by using the pointer of the previously last cell in the cell buffer to point to the position in the cell buffer occupied by the new cell.

44. The method of claim 41, further comprising:

providing an activation queue;

providing an active leaves queue for a physical output link; and upon reception of a cell from the switch core, linking the passive leaves queue to the activation queue and thereafter setting a pointer in the active leaves queue to the leaf table.

45. The method of claim 44, further comprising:

providing a root table; and linking the passive leaves queue to the activation queue using a pointer to the passive leaves queue as stored in a root table.

46. The method of claim 44, further comprising:

providing a root table;

determining whether there are no more cells in the cell buffer to be read out for an active leaf by comparing a head pointer stored in the leaf table to a cell buffer tail pointer stored in the root table, the head pointer stored in the leaf table pointing to the last cell in the cell buffer read by the leaf for the active link and the cell buffer tail pointer pointing to the last cell in the cell buffer.

47. The method of claim 44, further comprising:

providing a root table;

using the cell buffer to determine what cells, obtained from a switch core, are to be read out of the switching device, and wherein the root table has stored therein a number of entries in the cell buffer; an address of the last cell in the cell buffer; and a number of leaves for the most recently received cell pointed to by the cell buffer.

48. The method of claim 44, further comprising:

providing a root table; and storing in the root table a head pointer to a first passive leaves queue and tail pointer to a last passive leaves queue.

49. The method of claim 48, wherein the first passive leaves queue has stored therein a next pointer to a next passive leaves queue for linking the next passive leaves queue to the first passive leaves queue.

50. The method of claim 44, further comprising:

providing a root table;

using the cell buffer to determine what cells, obtained from a switch core, are to be read out of the switching device; and wherein a specified leaf is to be removed when the specified leaf attempts to read a cell for which a stop flag has been set, the stop flag having been set for a first cell to enter from a switch core after a command has issued to remove the leaf.

* * * * *